US 010880688B2

(12) United States Patent
Hajimiri et al.

(10) Patent No.: US 10,880,688 B2
(45) Date of Patent: Dec. 29, 2020

(54) DYNAMIC FOCUSING AND TRACKING FOR WIRELESS POWER TRANSFER ARRAYS

(71) Applicant: GuRu Wireless, Inc., Pasadena, CA (US)

(72) Inventors: Seyed Ali Hajimiri, Pasadena, CA (US); Behrooz Abiri, Pasadena, CA (US); Florian Bohn, Pasadena, CA (US); Farhud Tebbi, Pasadena, CA (US)

(73) Assignee: GuRu Wireless, Inc., Pasadena, CA (US)

( * ) Notice: Subject to any disclaimer, the term of this patent is extended or adjusted under 35 U.S.C. 154(b) by 0 days.

(21) Appl. No.: 16/719,878

(22) Filed: Dec. 18, 2019

(65) Prior Publication Data

US 2020/0196097 A1 Jun. 18, 2020

Related U.S. Application Data

(60) Provisional application No. 62/781,514, filed on Dec. 18, 2018.

(51) Int. Cl.
*H02J 50/40* (2016.01)
*H04W 4/02* (2018.01)
(Continued)

(52) U.S. Cl.
CPC ............ *H04W 4/025* (2013.01); *H02J 50/20* (2016.02); *H02J 50/40* (2016.02); *H04B 5/0037* (2013.01); *H04W 4/80* (2018.02)

(58) Field of Classification Search
CPC .. H04B 5/0025; H04B 5/0037; H04B 5/0043; H04B 5/0075; H01J 37/32073;
(Continued)

(56) References Cited

U.S. PATENT DOCUMENTS 4,468,624 A * 8/1984 Rehbein ............... H03K 5/05
327/277
10,090,714 B2 10/2018 Bohn et al.
(Continued)

FOREIGN PATENT DOCUMENTS

WO 2020132139 A1 6/2020

OTHER PUBLICATIONS

International Search Report and Written Opinion for International Application No. PCT/US2019/067281, search completed on Feb. 12, 2020, dated Feb. 27, 2020, 18 Pgs.
(Continued)

*Primary Examiner* — Jean A Gelin
(74) *Attorney, Agent, or Firm* — KPPB LLP

(57) ABSTRACT

Wireless power transfer systems and methods for focusing wireless power transfer arrays are disclosed. One embodiment includes a wireless power generating unit (GU) including a processing system configured to focus the RF power sources by: sending control signals to the control circuitry to perform a plurality of sweeps using each of a plurality of different basis masks; receiving a message from a RU containing a report based upon received power measurements made by the RU; and sending control signals to focus the RF power sources based on the received message from the RU. Furthermore, each sweep includes performing a phase sweep across a phase sweep range at a plurality of phase step increments with respect to a first group of RF power sources identified in a basis mask, where the first group of RF power sources comprises a plurality of RF power sources.

20 Claims, 15 Drawing Sheets
(11 of 15 Drawing Sheet(s) Filed in Color)

(51) Int. Cl.
*H02J 50/20* (2016.01)
*H04W 4/80* (2018.01)
*H04B 5/00* (2006.01)

(58) Field of Classification Search
CPC ............. H01J 37/32091; H01J 37/321; H01J 37/32128; H01J 37/32137; H02J 50/23; H02J 50/27; H02J 50/10; H02J 50/80; H02J 50/90; H02J 50/40; H02J 50/20; H02J 7/00034; H02J 7/0047
See application file for complete search history.

(56) References Cited

U.S. PATENT DOCUMENTS

| | | | | |
|---|---|---|---|---|
| 10,277,046 | B1* | 4/2019 | Colosimo | H02J 50/12 |
| 10,516,302 | B2* | 12/2019 | Lee | H02J 50/20 |
| 2013/0099584 | A1* | 4/2013 | Von Novak, III | H02J 50/10 307/104 |
| 2014/0009108 | A1* | 1/2014 | Leabman | H02J 50/80 320/107 |
| 2015/0167785 | A1* | 6/2015 | Lee | F16H 3/006 74/661 |
| 2015/0326061 | A1 | 11/2015 | Davison et al. | |
| 2016/0190872 | A1 | 6/2016 | Bohn et al. | |
| 2016/0301465 | A1* | 10/2016 | Olesen | H04B 17/14 |
| 2017/0063103 | A1* | 3/2017 | Do | H02J 50/12 |
| 2017/0077735 | A1 | 3/2017 | Leabman | |
| 2017/0271925 | A1 | 9/2017 | Plekhanov et al. | |
| 2017/0358950 | A1 | 12/2017 | Zeine et al. | |
| 2019/0006888 | A1 | 1/2019 | Hajimiri et al. | |
| 2019/0081514 | A1* | 3/2019 | Cha | H01Q 3/36 |
| 2019/0131827 | A1* | 5/2019 | Johnston | H02J 50/20 |
| 2019/0214855 | A1 | 7/2019 | Abiri et al. | |
| 2020/0006988 | A1* | 1/2020 | Leabman | A61B 8/56 |
| 2020/0076241 | A1* | 3/2020 | Tandai | G06F 1/263 |

OTHER PUBLICATIONS

Aumann et al., "Phased Array Antenna Calibration and Pattern Prediction Using Mutual Coupling Measurements", IEEE Transactions on Antenna and Propagation, vol. 37, No. 7, Jul. 1989, pp. 844-850.
Berra, "Analysis and Exploitation of Multiple Antennas Interaction in the Near-Field", Universita di Bologna, Dottorato Di Ricerca in Ingegneria Elettronica, Telecomunicazioni e Tecnologie Dell'Informazione, 2018, 111 pgs.
Costanzo et al., "Energizing 5G", IEEE Microwave Magazine, May 2017, pp. 125-136.
Groger et al., "Experimental Phased Array Radar Elra with Extended Flexibility", IEEE International Radar Conference, 1990, pp. 286-290.
Hedayat et al., "Hadamard Matrices and their Applications", Annals of Statistics, vol. 6, No. 6, 1978, pp. 1184-1238.
Liu et al., "A Near Field Focused Lens Antenna for Wireless Power Transmission Systems", 2018 IEEE Asia-Pacific Conference on Antennas and Propagation, Aug. 2018.
Mizojiri et al., "Wireless Power Transfer via Subterahertz-Wave", Applied Sciences, vol. 8, No. 12, Dec. 2018, 19 pgs.
Nariman, "Millimeter-Wave Wireless Power Transfer Systems for the Internet of Things", UC Irvine Electronic Theses and Dissertations, Retrieved from https://escholarship.org/uc/item/09b6c4b3, Published 2016, 110 pgs.
Nariman et al., "A Compact 60-GHz Wireless Power Transfer System", IEEE Transactions on Microwave Theory and Techniques, vol. 64, No. 8, Aug. 2016, pp. 2664-2677.
Nariman et al., "A Compact Millimeter-Wave Energy Transmission System for Wireless Applications", 2013 IEEE Radio Frequency Integrated Circuit Symposium, 2013, pp. 407-410.
Nariman et al., "A Switched-Capacitor mm-Wave VCO in 65 nm Digital CMOS", 2010 IEEE Radio Frequency Integrated Circuits Symposium, 2010, pp. 157-160.
Nariman et al., "High-Efficiency Millimeter-Wave Energy-Harvesting Systems Wth Milliwatt-Level Output Power", IEEE Transactions on Circuits and Systems II: Express Briefs, vol. 64, No. 6, Jun. 2017, pp. 605-609.
Ng et al., "Wireless Information and Power Transfer: Energy Efficiency Optimization in OFDMA Systems", IEEE Transactions on Wireless Communications, vol. 12, No. 12, Dec. 2013, pp. 6352-6370.
Patton et al., "Near-Field Alignment of Phased-Array Antennas", IEEE Transactions on Antennas and Propagation, vol. 47, No. 3, Mar. 1999, pp. 584-591.
Sander, "Monitoring and Calibration of Active Phased Arrays", IEEE International Radar Conference, 1985, pp. 45-51.
Yedavalli et al., "Far-Field RF Wireless Power Transfer with Blind Adaptive Beamforming for Internet of Things Devices", IEEE Access, vol. 5, Feb. 8, 2017, pp. 1743-1752.

* cited by examiner

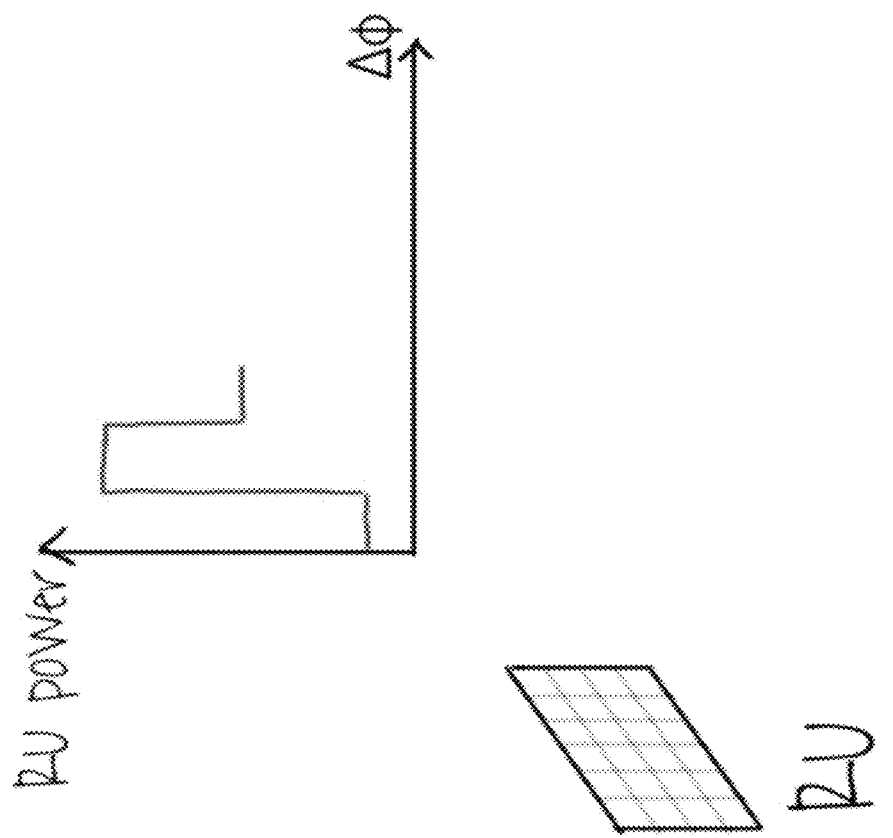
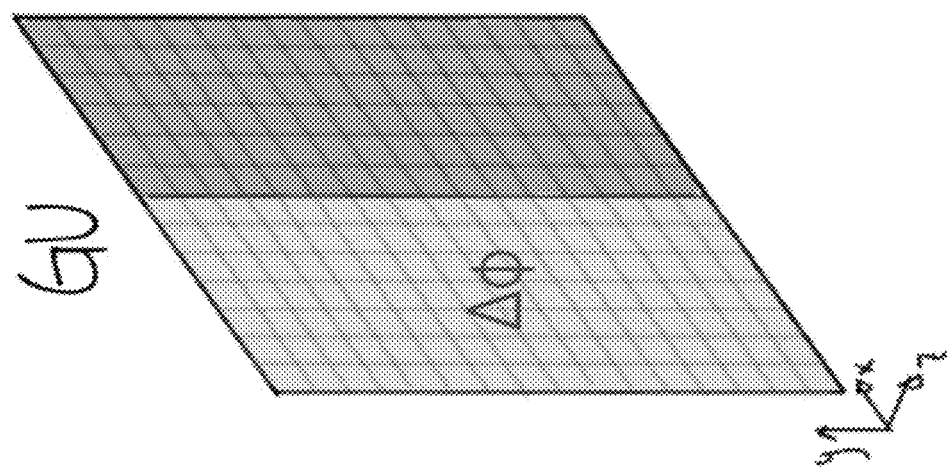
FIG. 8

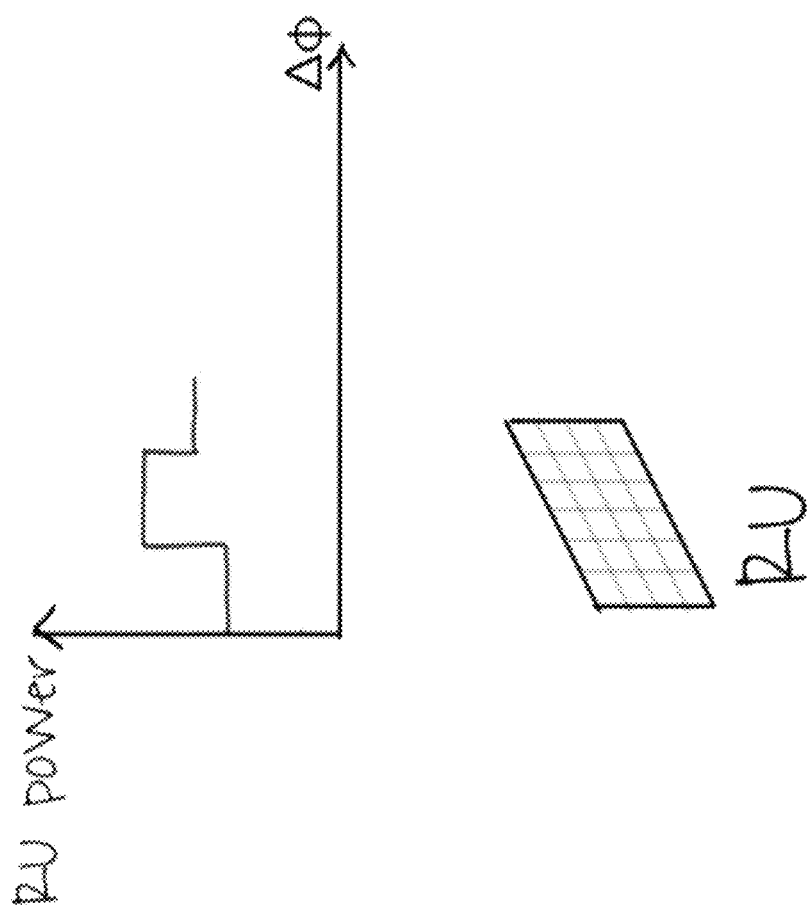
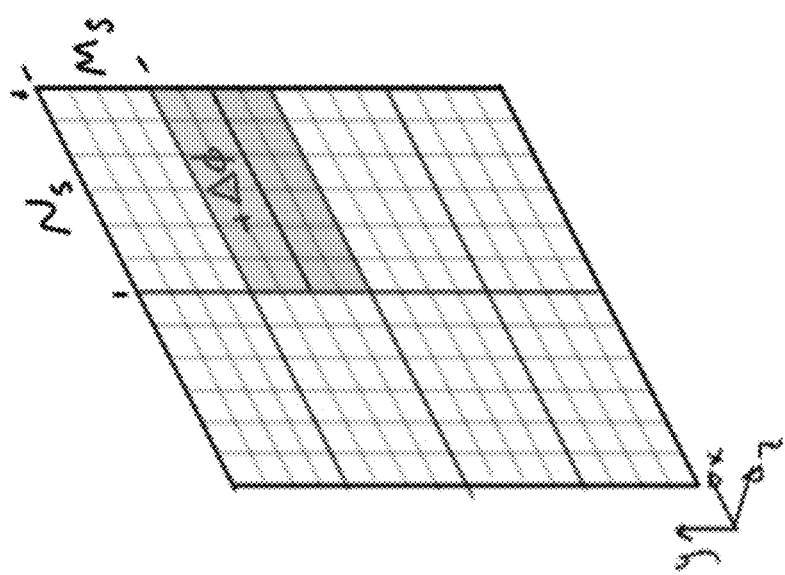
FIG. 11

```
comm_count=1;
best_phase=initial_phase;
load_GU best_phase;
for iteration=start_iter to end_iter
    [Ms,Ns]=segment_size(iteration);
    PSR=phase_sweep_range(iteration);
    NPS=number_of_phase_steps(iteration);
    CRL=communication_run_length(iteration);
    SYNC=sync_type(iteration);
    Generate mask(Ms*Ns) //Generate maskset of size Ms*Ns
    for mask_num=1 to Ms*Ns
        current_mask=mask(mask_num)
        for segment_num=1 to (M*N)/(Ms*Ns)
            Send SYNC;
            for phase_setting=0 to PSR steps PSR/NPS
                for r=1 to Ms
                    for c=1 to Ns
                        phase(r,c)=
mod(best_phase(r,c)+current_mask(r,c)*phase_setting,module(r,c));
                    end
                end
                Load_GU phase;
            end
            GU_SR(comm_count)=[phase_setting, segment_num, mask_num];
            if comm_count=CRL then
                Receive RU_BSR; //BSR: Best Settings Record
                for index=1 to CRL
                    for r=1 to Ms
                        for c=1 to Ns
                            best_phase(r,c)=mod(best_phase(r,c)+
                                mask(GU_SR(index))*phase_setting(RU_BSR),module(r,c));
                        end
                    end
                end
                Load_GU best_phase;
                comm_count=1;
            else
                comm_count=comm_count+1;
            endif
        end
    end
end
```

FIG. 12

DYNAMIC FOCUSING AND TRACKING FOR
WIRELESS POWER TRANSFER ARRAYS

CROSS-REFERENCE TO RELATED APPLICATIONS

The current application claims priority to U.S. Provisional Patent Application No. 62/781,514, entitled "Dynamic Focusing and Tracking for Wireless Power Transfer Arrays" and filed Dec. 18, 2018, the disclosure of which is incorporated herein by reference in its entirety.

FIELD OF THE INVENTION

The present invention relates generally to wireless power transfer and more specifically to non-proximity wireless power transmission using beamforming and focusing.

BACKGROUND

Non-proximity wireless power transmission at a distance through use of radio frequency (RF) and mm-wave beam forming and focusing can enable and/or enhance a plethora of new applications. For example, the proliferation of internet of things (loT) devices and sensors can be substantially accelerated by wirelessly delivering power to them and avoiding the need for extra wiring during installation of such devices. Another example of practical usage of such devices is continuous wireless charging of portable personal devices, such as smart phones and tablets which can significantly enhance their usability and can, in the long run, reduce the demand on the amount of energy that needs to be carried by such devices (e.g., as in a battery). In addition to the devices described above, many other small devices ranging from a wireless mouse or keyboard to thermostats, security sensors and cameras can benefit from wireless power transfer, which can eliminate the need to plug them in or change their batteries.

When performing wireless power transfer using an array of elements, efficiency is highest when the phases of the transmitted signals add constructively at the device. One proposed approach to determine the phases of the transmitter elements is to have the device that is to be charged transmit a pilot signal. Each transmitter can record the phase of the received pilot signal and calculate a corresponding conjugated phase, which it can then use to transmit an RF signal. In order to implement this approach, the device being charged must implement circuitry to generate a pilot signal that is frequency matched to the frequency used to transmit wireless power by the transmitter. The transmitter is also required to have at least one receiver per transmit antenna element thus further adding to the complexity of the system. Accordingly, such systems involve relatively high complexity in both the transmitter as well as the receiver.

SUMMARY OF THE INVENTION

Systems and methods in accordance with various embodiments of the invention perform wireless power transfer by applying phase and/or amplitude sweeps to groups of elements within an array of wireless power sources. Although, there exists a combination of phases and/or amplitdues of the wireless power sources that results in maximum power at the charging device, finding such combination (i.e., optimization for a given location and orientation) is a challenging task in general.

Several approaches can be used to find phase settings to transfer the maximum power to a given location for wireless power transfer. One approach is to sweep through the phase settings of each element individually, while the other elements are maintained at a constant phase. In this approach the power received by the charging device is monitored and the index of the phase setting with the highest received power is recorded. This charging device can then transmit feedback either after each sweep or a predetermined number of sweeps. Based upon the feedback, the phase settings of elements can be adjusted to the phases of the swept elements that produced the largest power and the process continues the sweep of remaining elements. This approach can result in small variations in the received power at the charging device, especially when a large array is involved, since the power fluctuations as the phase is swept can be due to interference between one element and the rest of the elements. In practice, due to noise and interference, the error in the detected signal can be quite large and can result in a significant reduction in the dynamic range and accuracy of received power measurements. Also, fine tuning of the phase can be further hampered by the yet smaller changes in the receiving device's power which can be almost entirely masked by noise and interference, resulting in errors. Another challenge with such approaches is that in reality the coupling between the elements (sometimes referred to as phase pulling or simply pulling) can produce undesirable projections and imperfections even when the phases were individually and independently optimized. Furthermore, the approach of varying the phase of elements one at a time does not scale well to larger arrays. To illustrate this, consider an array with 100 elements, where the phase of each element is determined by an 8-bit (1 byte) word. The number of possible phase combinations in such a system is given by:

$$256^{100} = 2^{800} \approx 10^{240}$$

This makes searching through all possible combinations all but impossible. Even at the rate of trying 1 million combination per second, this will take $3 \times 10^{226}$ years, or $3 \times 10^{216}$ times the estimated life of the universe. Therefore, more efficient approaches for finding of the appropriate phase combination for optimum power transfer is necessary.

Wireless power transfer systems in accordance with many embodiments of the invention use a process for identifying an efficient phase state that is adaptive, and dynamic. In a number of embodiments, the process utilizes a set of basis masks to determine the manner in which to apply phase and/or power sweeps to groups of elements an array of elements during successive iterations to identify optimal power transfer settings. In this way, the phase (and amplitude) settings for the elements in the array can be adjusted to maximum received power. As the phase and/or amplitude sweeps are applied, measurements of the received power can be made by the charging device and used to send periodic reports to the wireless power source.

Wireless power transfer systems in accordance with many embodiments of the invention operate reliably in noisy and interference-prone environments due to the higher dynamic range and multi-layer adaptive natures. They can also be highly suitable for multipath environments, which can be prominent in indoor and other terrestrial applications. Also due to its option to operate adaptively, convergence time can be significantly shorter, while producing significantly higher receive powers at the RU. The robustness and reliability of the approach to environmental and system nonidealities (for instance, coupling and pulling) can also be higher due to blending of the individual core values in the defined optimization basis masks. The disclosed invention has several aspects that can work in concert and are discussed below in no particular order.

One embodiment includes a wireless power generating unit (GU) including: a plurality of RF power sources, where the RF power sources are synchronized and each RF power source comprises at least one antenna element; control circuitry configured to adjust at least the phases of the RF power sources; a processing system configured to generate control signals to control at least the phase of the RF power sources via the control circuitry; and a receiver configured to receive messages from at least one recovery unit (RU). In addition, the processing system is configured to focus the RF power sources by: sending control signals to the control circuitry to perform a plurality of sweeps using each of a plurality of different basis masks; receiving via the receiver at least one message from a RU, where each of the at least one message contains a report based upon received power measurements made by the RU during at least one of the plurality of sweeps; and sending control signals to the control circuitry of the plurality of RF power sources to focus the RF power sources based at least in part upon the received at least one message from the RU. Furthermore, each sweep includes performing a phase sweep across a phase sweep range at a plurality of phase step increments with respect to a first group of RF power sources identified in a basis mask, where the first group of RF power sources comprises a plurality of RF power sources.

In a further embodiment, the control circuitry of at least one of the RF power sources is also configured to adjust the amplitude of the RF power source; and the sweep further includes performing an amplitude sweep across an amplitude sweep range at a plurality of amplitude step increments with respect to the first group of RF power sources identified in the basis mask.

In another embodiment, the control circuitry of the plurality of RF power sources is also configured to adjust the polarization of the RF power sources; and the sweep further includes performing the phase sweep with respect to each polarization of the RF power sources.

In a still further embodiment, each phase sweep further comprises maintaining a phase offset of a second group of RF power sources identified in the basis mask during the phase sweep, where the second group of RF power sources does not include any of the RF power sources from the first group.

In still another embodiment, each phase sweep further includes simultaneously performing an opposite phase sweep across the phase sweep range at a plurality of negative phase step increments with respect to a second group of RF power sources identified in the basis mask, where the second group of RF power sources does not include any of the RF power sources from the first group.

In a yet further embodiment, the processing system is further configured to commence at least one phase sweep by sending control signals to the control circuitry to generate a synchronization pulse using the RF power sources.

In yet another embodiment, the size of the basis masks from the plurality of different basis masks changes between at least some of the plurality of phase sweeps.

In a further embodiment again, the phase sweep range changes between at least some of the plurality of phase sweeps.

In another embodiment again, over the course of the plurality of phase sweeps: the size of the basis masks increases; and the size of the phase sweep range decreases.

In a further additional embodiment, the phase step increment changes between at least some of the plurality of phase sweeps.

In a still yet further embodiment, the phase sweep range changes between at least some of the plurality of phase sweeps.

In still yet another embodiment, the phase step increment changes between at least some of the plurality of phase sweeps.

In a still further embodiment again, the plurality of different basis masks comprises a set of basis masks that are orthogonal.

In still another embodiment again, the plurality of different basis masks comprises a set of basis masks that are nearly orthogonal.

In a still further additional embodiment, the at least one message includes a plurality of message and that contain reports based upon received power measurements made by the RU during different numbers of sweeps.

In still another additional embodiment, the processing system is further configured to: receive via the receiver a message from the RU indicating a decrease in received power at the RU; determine a location based upon the focus of the RF power sources; and perform a guided search by: sending control signals to the control circuitry to adjust the phases of the RF power sources to perform a focusing sequence comprising focusing the RF power sources on a sequence of locations proximate the determined location; receiving via the receiver at least one new message from the RU, where each of the at least one message contains a report based upon received power measurements made by the RU during at least a portion of the focusing sequence; and sending control signals to the control circuitry of the plurality of RF power sources to update the focus the RF power sources based at least in part upon the received at least one new message from the RU.

In a yet further embodiment again, the message from the RU indicating a decrease in received power at the RU also includes tracking data based upon at least one measurement made using an inertial measurement unit; and the sequence of locations proximate the determined location on which the RF power sources are focused during the guided search are selected at least in part based upon the tracking data.

In yet another embodiment again, the RU comprises a coherent receiver and is configured to measure amplitude and phase information; and the processing system is configured to: receive via the receiver at least one message containing amplitude and phase information measured by the RU; and update at least the phases of the RF power sources based at least in prat on the received at least one message containing amplitude and phase information measured by the RU.

Another embodiment of the invention includes a wireless power generating unit (GU) including: a plurality of RF power sources, where the RF power sources are synchronized and each RF power source comprises at least one antenna element; control circuitry configured to adjust at least the phases of the RF power sources; a processing system configured to generate control signals to control at least the phase of the RF power sources via the control circuitry; and a receiver configured to receive messages from at least one recovery unit (RU). In addition, the processing system is configured to focus the RF power sources by: sending control signals to the control circuitry to perform a plurality of sweeps using each of a plurality of different basis masks, receiving via the receiver at least one message from a RU, where each of the at least one message contains a report based upon received power measurements made by the RU during at least one of the plurality of sweeps; and sending control signals to the control circuitry of the plurality of RF power sources to focus the RF power sources based at least in part upon the received at least one message from the RU. Furthermore, each sweep includes performing a phase sweep across a phase sweep range at a plurality of phase step increments with respect to a first group of RF power sources identified in a basis mask, where the first group of RF power sources comprises a plurality of RF power sources. Additionally, the size of the basis masks from the plurality of different basis masks changes between at least some of the plurality of phase sweeps, the phase sweep range changes between at least some of the plurality of phase sweeps, and the phase step increment changes between at least some of the plurality of phase sweeps.

An embodiment of a method of the invention for performing wireless power transfer includes: sending control signals to control circuitry of a wireless power generating unit (GU) that comprises a plurality of RF power sources to perform a plurality of sweeps of the RF power sources using each of a plurality of different basis masks, receiving via a receiver in the GU at least one message from a recovery unit (RU), where each of the at least one message contains a report based upon received power measurements made by the RU during at least one of the plurality of sweeps; and sending control signals to the control circuitry of the GU to focus the RF power sources based at least in part upon the received at least one message from the RU. In addition, each sweep includes performing a phase sweep across a phase sweep range at a plurality of phase step increments with respect to a first group of RF power sources identified in a basis mask, where the first group of RF power sources comprises a plurality of RF power sources.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 8 conceptually illustrates application of a binary mask in accordance with an embodiment of the invention.

FIG. 11 illustrates segmentation of a GU array in accordance with an embodiment of the invention.

FIG. 12 is example pseudocode that can be used to implement a wireless power transfer process in accordance with an embodiment of the invention.

DETAILED DISCLOSURE OF THE INVENTION

Figure 1:
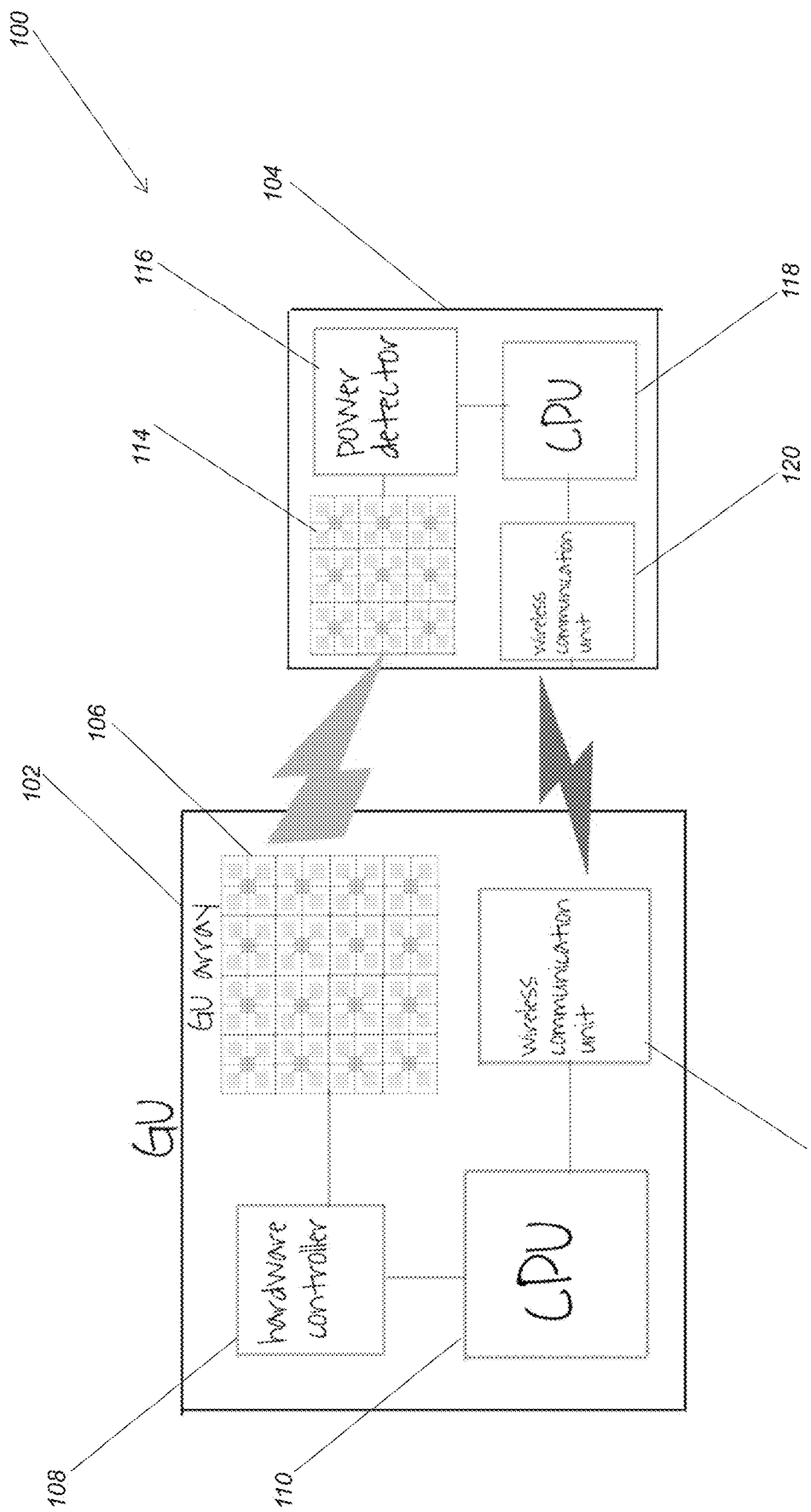
FIG. 1 illustrates a general architecture for a wireless power transfer system in accordance with an embodiment of the invention.

Turning now to the drawings, wireless power transfer systems and methods for focusing wireless power transfer arrays in accordance with various embodiments of the invention are illustrated. Wireless power transfer systems in accordance with various embodiments of the invention include one or more wireless power generation units (GU) that can include multiple synchronized RF power sources (RF sources) and antennas, in addition to various other functions such as (but not limited to) processing capability, hardware interfaces, and/or communication capabilities. In many embodiments, each GU includes circuitry that can adjust the phase of each transmitted RF source to allow constructive interference in a specific location or multiple locations in space where one or more recovery unit(s) (RU) is present. In certain embodiments, the GU can also adjust the amplitude of each transmitted RF source. In embodiments where the GU can adjust the amplitude in addition to the phase of the RF sources, the GU can generate multiple beams enabling the GU to simultaneously deliver power to multiple RUs in different locations within the field of view of the GU. In several embodiments, the recovery unit (RU) includes a power recovery antenna (rectenna) or rectenna array and can also include, among other capabilities, additional measurement, processing and/or communication capabilities.

In order to perform power transmission efficiently, GU in accordance with many embodiments of the invention can transmit and transfer power in different directions and orientations and can also change the direction and orientation rapidly and effectively. There exists a combination of phases of the RF power sources on the GU that maximizes the energy concentration for a given RU location and orientation. An important performance parameter of a wireless power transfer system can be focusing time, namely the speed by which a determination concerning a power transfer setting can be found, when an RU initially requests power, the location of the RU (or GU) changes, and/or when other system parameters change. With sufficiently small processing time real-time RU tracking can be achieved, where the system dynamically re-computes a set of efficient power transfer settings at a sufficiently fast rate that the system effectively performs real-time RU tracking and power transfer to the RU is never interrupted.

In several embodiments, the process for determining power transfer settings applies phase and/or amplitude sweeps to groups of elements within the antenna array of the GU and utilizes periodic feedback from one or more RUs concerning received power to select phase and/or amplitude for the elements to which the sweeps were applied. By applying phase and/or amplitude sweeps to groups of elements in an antenna array, a larger variation in the dynamic range of the received power can be observed at a RU during the sweep. Accordingly, the observed variations can significantly exceed the noise within the system enabling more accurate identification of the combination of phase and/or amplitude settings that result in the greatest efficiency of wireless power transfer. When successive groups of elements to which sweeps are applied are selected appropriately, an efficient set of power transfer settings can be identified more reliably and more rapidly than can be achieved by modifying the settings of one element at a time. When multiple RUs are present and the GU is capable of sweeping amplitude and phase, the GU can separately determine the amplitude and phase settings that maximize received power at each RU using sweeps in the manner described above. The resulting complex sum of the amplitude and phase states separately determined for each RU can then be utilized to simultaneously deliver focused wireless power to both RUs.

In the context of wireless power transfer, a variety of different power transfer settings can be regarded as efficient. For example, efficient power transfer settings may be the power transfer settings that are in fact optimal (i.e. achieve the highest level of power transfer efficiency/maximum received power at a RU). In several embodiments, efficient power transfer settings are the power transfer settings that are the most efficient power transfer settings that can be identified within a certain period of time and/or amount of computation. In a number of embodiments, efficient power transfer settings can be the first power transfer settings satisfying a focusing criterion identified during a wireless power transfer maximization process. Accordingly, it should be appreciated that the power transfer settings selected by a wireless power transfer maximization process is not necessarily the global optimum (i.e. best of all possible power transfer settings). Quite the contrary, the power transfer settings selected by a wireless power transfer maximization process is routinely sub-optimal. Therefore, references to power transfer settings as being maximized and/or optimal herein should be understood as not necessarily referring to the globally optimal power transfer settings, but to any power transfer settings that meet criteria established by the wireless power transfer process as being suitable for configuring an antenna array to perform wireless power transfer. Indeed, a wireless power transfer process may in fact identify multiple potential power transfer settings as being optimal through the application of phase and/or amplitude sweeps to groups of elements within an antenna array and the GU can determine the specific power transfer settings that are most appropriate to the requirements of a given application.

In a number of embodiments, the manner in which phase and/or amplitude sweeps are applied to groups of elements within an antenna array of a GU is determined based upon a series of basis masks. As is discussed below, the basis masks can enable the wireless power transfer maximization process to explore all possible power transfer settings of the GU (i.e. the basis masks form a complete basis for the power transfer settings of the GU). In several embodiments, the basis masks only enable efficient exploration of a subset of all possible power transfer settings of the GU (i.e. the basis masks form an incomplete basis for the power transfer settings of the GU). Use of basis masks that form an incomplete basis can be advantageous in circumstances where prior information can guarantee that globally optimal or near-optimal power transfer settings can be obtained rapidly with a high degree of confidence by only searching within a subset of all possible power transfer settings for the GU. In many embodiments, the basis masks form an orthogonal or nearly orthogonal basis, which can (in some applications) simplify the implementation of the wireless power transfer maximization process.

The basis mask sets do not need to be applied to the full size of the antenna array of a GU. In a number of embodiments, the array is broken down into smaller segments, where within each segment the appropriate set of basis masks determines the manner in which phase sweeps are applied to particular phase shifters. In several embodiments, the size of the segments, the basis mask sets applied to each segment, the phase sweep ranges of the phase sweeps and the number of phase steps (or the phase step increment) can all be different within different overall iterations of a calibration loop.

In a number of embodiments, the overall focusing process involves one or multiple iterations of a process of performing phase and/or amplitude sweeps using a set of masks with respect to each segment in an antenna array of a GU. During the iterations, the GU can be periodically receiving reports based upon measurements of received power from one or more RUs. These reports can then be used by the GU to update the phase settings of elements that were the subject of the sweeps that occurred during the period in which the measurements were made. The number of sweeps reported within each communication interval can be referred to as the communication run length (CRL). The length of the CRL is typically dependent upon the expected communication latency within the system. As is discussed further below, the manner in which the sweeps are conducted can enable sweeps to be performed independently allowing for longer CRLs. The loop can start from a random initial state, use previously evaluated power transfer settings, or power transfer settings corresponding to an estimated or reported location of a RU as a starting point to obtain faster convergence to power transfer settings that meet a particular efficiency criterion (e.g. maximize received power at a RU). In each iteration, the phase and/or amplitude sweep range, the phase and/or amplitude step increment, and the segment sizes can change. Larger phase and/or amplitude step increments result in a smaller number of received power measurements being captured at the RU, which can result in a higher speed of operation and lower complexity. Reducing the phase and/or amplitude sweep range can refine the phase and/or amplitude offsets applied to specific elements within the antenna array of the GU. In many embodiments, reductions in the phase and/or amplitude sweep range can occur in the later stages of the optimization, where the wireless power transfer maximization process effectively performs fine tuning of the power transfer settings. In many embodiments, smaller segment sizes can be used in the early iterations in combination with a relatively larger phase and/or amplitude sweep range. Due to large changes in the phase and/or amplitude of elements with respect to each other, a large change in the received power at a RU can be observed and the larger dynamic range allows for a smaller number of elements to be changed in each step (e.g. smaller segment sizes). In a number of embodiments, as the main loop progresses, and the coarse phase and/or amplitude tuning transitions toward finer tuning (e.g. smaller phase and/or amplitude sweep ranges), the variation in the dynamic range of the received power at a RU can become smaller and larger segmentations (potentially up to full array size) can be utilized as the larger number of elements can generate a larger amount of received power despite the smaller PSR. As can readily be appreciated the specific manner in which the focusing process is configured is largely dependent upon the requirements of specific wireless power transfer systems.

Wireless power transfer systems and processes for selecting in accordance with various embodiments of the invention are discussed further below.

Wireless Power Transfer System

Systems and methods in accordance with various embodiments of the invention can utilize any of a variety of wireless power transfer architectures that include multiple RF power sources. Accordingly, the systems and methods described herein should be understood as not being limited to any specific wireless power transfer architecture. Quite the contrary, the methods described herein for wireless power transfer should be understood as being adaptable to any wireless power transfer system that utilizes phase and/or amplitude control to perform focusing of RF power from multiple RF power sources.

A general architecture for a wireless power transfer system in accordance with an embodiment of the invention is conceptually illustrated in FIG. 1. The wireless power transfer system 100 includes at least one GU 102 that transmits power to at least one RU 104. The GU 102 includes and antenna array 106. The phase and/or amplitude of the RF signal transmitted by each element in the antenna array 106 can be controlled by a hardware controller 108. In several embodiments, the hardware controller is limited to individually controlling the phase of the RF signals transmitted by each element.

Figure 2:
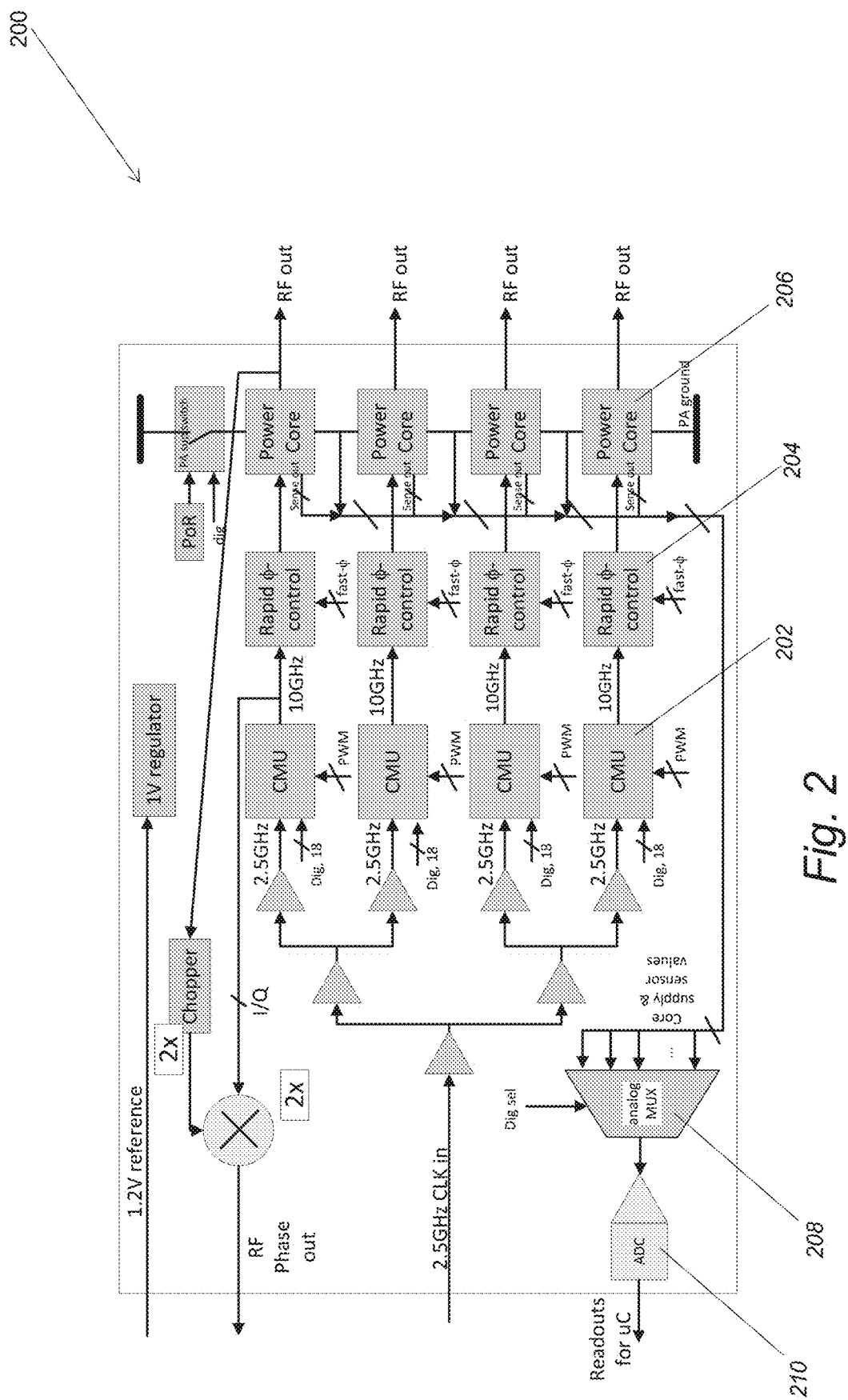
FIG. 2 illustrates a hardware controller that can be utilized within a GU to generate multiple RF outputs with independently controlled phases from a single reference signal in accordance with an embodiment of the invention.

A hardware controller that can be utilized within a GU to generate multiple RF outputs with independently controlled phases from a single reference signal in accordance with an embodiment of the invention is illustrated in FIG. 2. The hardware controller 200 can independently control the phase setting of each one of the elements using different phase control mechanisms, such as (but not limited to) a phased-locked loop (PLL) with an additional phase controller. Such a PLL could also perform clock multiplication and can be referred to as a clock multiplier unit (CMU) 202. In the case where a CMU 202 is used for phase shifting, each CMU can control the phase of one transmission element independently via digital steps. Each CMU receives a reference clock signal as an input and applies a phase shift to a multiplied version of the reference clock signal (i.e. a signal having a frequency that is a multiple of the reference signal). In the illustrated embodiment, the CMUs 202 receive a 2.5 GHz CLK_in signal and output a phase shifted 10 GHz signal. Additional phase control can be applied using a rapid phase control circuit 204. The rapid phase control circuit 204 can be used to modulate a data signal onto the transmitted wireless power signal. In a number of embodiments, a modulation scheme such as a Phase Shift Keying or Quadrature Phase Shift Keying modulation scheme can be utilized. In several embodiments, a rapid amplitude control circuit can also be provided that can allow the use of more complex modulation schemes including (but not limited to) Quadrature Amplitude Modulation. Separate power amplifiers 206 then output RF signals to each of the elements in the antenna array.

In the illustrated embodiment, the hardware controller 200 includes additional hardware enabling measurement of the output power of the power amplifiers. Specifically, a multiplexer 208 enables an analog to digital converter 210 to measure a sensor output signal from each of the power amplifiers. The digitized output can be provided to the processing system of the GU to enable monitoring of output power delivered by the individual elements of the antenna array.

In addition to changing the phases of the individual elements, the control mechanism may also change the amplitudes of the individual elements, either independently or together with the phase settings. Changing the amplitude of the GU elements may allow further improvement in the overall energy available to the RU for recovery and further minimization of the power spill over. The methods and procedures discussed herein are, in general, applicable to controlling both phase and amplitude even when discussed primarily in one context or the other.

Referring again to the GU 102 illustrated in FIG. 1, the functions of the GU are coordinated by a processing system 110 that can be implemented using a CPU and a memory system, a Digital Signal Process (DSP), a Graphics Processing Unit (GPU), a microcontroller, an Field Programmable Gate Array (FPGA), and/or an Application Specific Integrated Circuit (ASIC). In many embodiments, the processing system 110 is an application processor that is configured by software stored in memory (not shown) that coordinates communication between the GU 102 and the at least one RU 104 and/or additional GUs. In several embodiments, the software can also configure the processing system 110 to perform a process to determine appropriate power transfer settings for the antenna array 102 given requests for power made by the at least one RU 104. As can readily be appreciated, processing systems in accordance with various embodiments of the invention can be configured to perform any processes appropriate to the requirements of specific applications.

The GU 102 also includes a wireless communication unit 112. In many embodiments, the wireless communication unit can include wireless communication capabilities including but not limited to the ability to communicate using any of the WIFI standards specified in the IEEE 802.11 family of protocols. In a number of embodiments, the wireless communication unit can also in addition or alternatively implement any of the Bluetooth wireless communication protocols including those specified in the IEEE 802.15 family of protocols. As can readily be appreciated, GUs 102 in accordance with various embodiments of the invention can include hardware to enable communication using any of a variety of wired and/or wireless communication protocols. While the wireless communication unit 112 is shown as a distinct component, in certain embodiments the processing system 110 and the wireless communication unit 112 can be implemented as a single system on chip.

Referring again to the RU 104, RUs in accordance with various embodiments of the invention can utilize a variety of means of power recovery, such as (but not limited to) one or more rectennas to collect RF energy and convert it to DC power. In the illustrated embodiment, the RU 104 includes a rectenna array 114. A power detector 116 can monitor the rectenna array 114 and provide received power measurements to a processing system 118. In several embodiments, the processing system 118 is implemented using any of the various processing system configurations 110 described above. The RU 104 also includes a wireless communication unit 120 that can be implemented using any of the components described above with respect to the wireless communication units 112 that can be utilized in GUs described above.

While specific wireless power transfer systems are described above with reference to FIGS. 1 and 2, any of a variety of wireless power transfer systems that utilize multiple wireless power sources with controllable phase and/or power can be utilized as appropriate to the requirements of specific applications in accordance with various embodiments of the invention. Processes for focusing multiple wireless power sources in a wireless power transfer system in accordance with various embodiments of the invention are discussed further below.

Focusing Wireless Power Transfer

In order to maximize the efficiency of wireless power transfer between a GU and a RU, wireless power transfer systems in accordance with various embodiments of the invention can undergo a focusing process. In several embodiments, the focusing process involves adjusting the phase and/or amplitude of groups of elements in an array of wireless power sources and measuring the power received at the RU. The RU can provide feedback concerning the received power that resulted from each of the adjustments to the GU, which can make further adjustments based upon the feedback and continue iterating until a desired level of wireless power transfer efficiency is achieved.

In many embodiments, the focusing process involves the GU simultaneously modifying the phase of groups of elements in a coordinated manner to determine an efficient phase state for the elements. By performing phase sweeps with respect to groups of elements, the focusing process can generate much larger changes in received power at the RU than can be observed by modifying the phase of a single element and/or randomly applying fixed positive or negative phase perturbations to all the elements. In this way, focusing processes in accordance with various embodiments of the invention tend to be more robust to noise than conventional processes. By analyzing the change in the received power at one or more RUs in response to the phase sweeps, a determination can be made concerning the specific phase state or phase states that achieve efficient wireless power transfer.

In several embodiments, multiple phase sweeps are performed using a different group of elements during each of the phase sweeps. The group of elements to which a phase sweep is applied can be referred to as a segment of an antenna element array or segment. Within each segment a basis mask can be utilized to determine the nature of the phase sweep applied to a particular element within the group. In several embodiments, the basis mask determines whether the phase sweep involves positive phase step increments or negative phase step increments over a phase sweep range (PSR). In a number of embodiments, the basis masks determine whether or not a phase sweep is applied to a particular element. In many embodiments, the basis mask can include any value including (but not limited to) a value that can be utilized to modify the manner in which a phase step increment is applied to a phase shifter (e.g. signed integers, real numbers, or complex numbers, to name a few additional possibilities).

Figure 3:
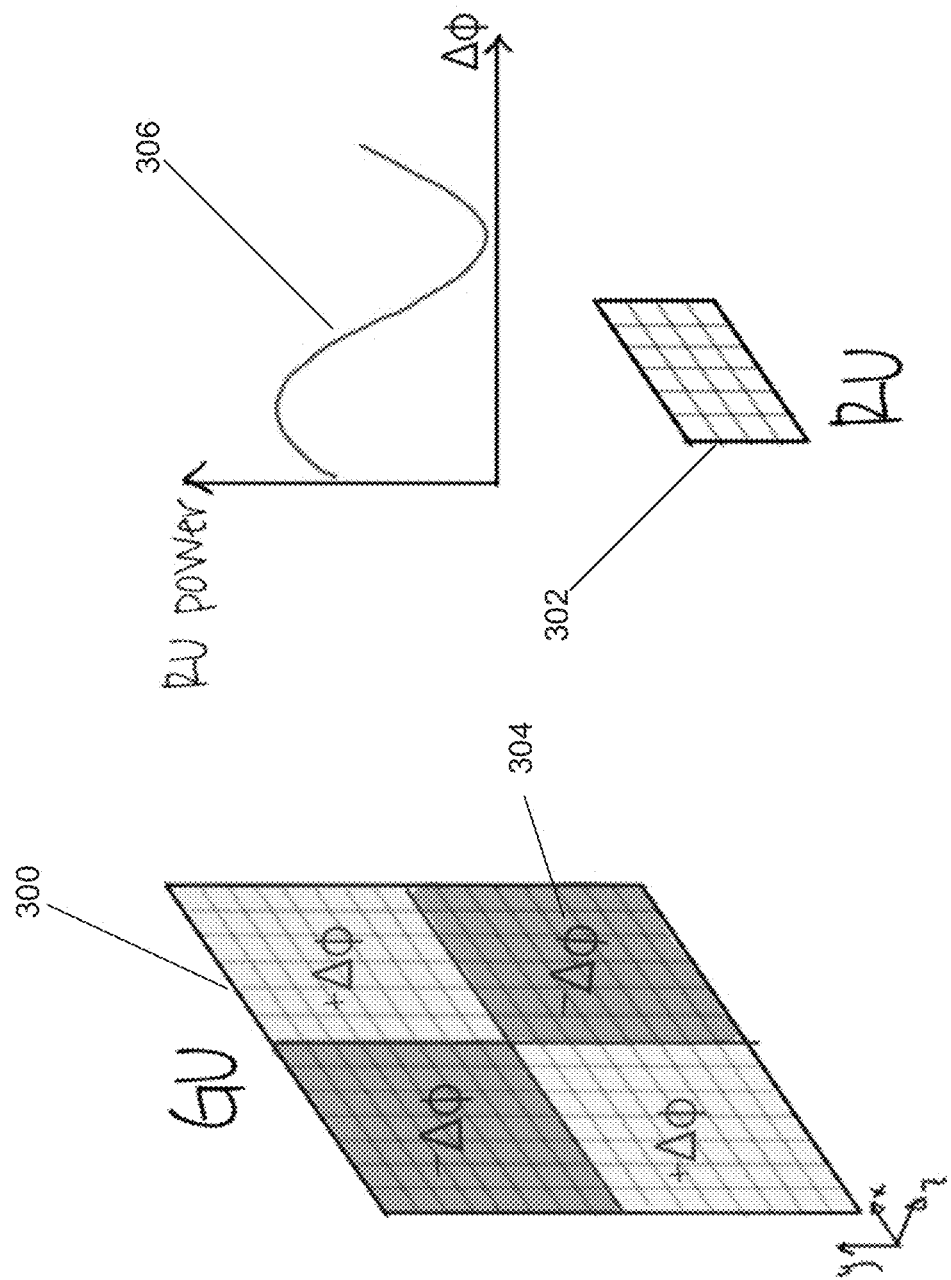
FIG. 3 conceptually illustrates the manner in which a GU can focus wireless power transfer on a specific RU by performing phase sweeps using basis masks in accordance with an embodiment of the invention.

The manner in which a GU can focus wireless power transfer on a specific RU by performing phase sweeps using basis masks in accordance with an embodiment of the invention is conceptually illustrated in FIG. 3. In the illustrated embodiment, the GU 300 directs wireless power to a RU 302. The output of the sensor can serve as a calibration signal. In the illustrated embodiment, the received power measured at the RU can be communicated to the GU periodically to enable a focusing process to be performed. As is discussed above, a basis mask 304 can be utilized to perform phase sweeps of different groups of elements of the GU 300 antenna array resulting in changes of the received power (306) at the RU 302. By repeating the process using different basis masks, the solution space of phase states can be explored to identify an efficient and/or optimal phase state for wireless power transfer between the GU and the RU. Although the discussion above references phase sweeps, it should be readily appreciated that the sweeps can involve sweeping both amplitude and phase. In addition, where the antenna elements can be configured to transmit using different polarizations, the sweeps can also involve performing and amplitude and phase sweep using a first polarization and then adjusting the polarizations of the antenna elements and performing the same amplitude and phase sweep again.

As is discussed in detail below, the selection of the basis masks (masks) utilized within a focusing process can determine the extent to which the focusing process can identify an optimal phase state for performing wireless power transfer and/or the speed with which the optimal phase state can be identified. While not necessary, the use of orthogonal or quasi-orthogonal masks can facilitate evaluation of the optimum phases for multiple masks independently and sequentially without the need to update the GUs phase settings after each phase sweep. This can be particularly useful in the presence of latency or speed limitations for communications from RU back to the GU. This can be particularly useful in the presence of latency or speed limitations for communications. The orthogonal and quasi-orthogonal masks can enable the phase sweeps to be done independently and the aggregate result effectuated after a predefined number of masks have gone through the phase sweep. In a number of embodiments, the number of phase sweeps performed between two communications from a RU determines the (CRL) (measured in number of phase sweeps). CRL can be as low as one (1) with no fundamental upper bound. The quality of the basis can determine the practically optimum CRL and the nonideality of the system (e.g., due to coupling and/or pulling) may present practical limits to the maximum CRL used. In other embodiments, the CRL can be defined in any of a number of different ways including but not limited to the number of masks swept between two communications from the RU, and/or the number of segments swept between two communications from the RU.

In many embodiments, the focusing process is able to identify power transfer settings that enable efficient wireless power transfer by repeating the process of performing sweeps of phase or sweeps of both phase and amplitude with respect to different segments of the antenna array using different segment sizes, segment shapes, basis masks, phase step increments, and/or phase ranges. The segment sizes, basis masks, phase step increment size and/or phase ranges utilized during the focusing process can be designed to rapidly identify the power transfer settings that optimizes received power. As a general rule, large phase step increments produce significant changes in received power. In addition, increasing the size of a segment also increases the impact of a phase step increment on received power. Therefore, focusing processes in accordance with a number of embodiments of the invention commence with comparatively smaller segment sizes and larger phase step increments. As the focusing process progresses, the phase step increments can be reduced to provide refinement of the phase state. In order to observe the effect of these smaller phase step increments in the presence of noise, the size of the segments can be increased as the phase step increments are decreased. Processes for selecting segment shape and/or size, generating masks, and/or determining phase step increment size and/or phase ranges utilized when performing phase sweeps during a focusing process in accordance with various embodiments of the invention are discussed further below.

In a number of embodiments, the RU establish a communication channel (e.g. by Bluetooth) to send information between the GU and the RU. Establishing a communication channel between the GU and the RU does not, however, indicate that the RU is within the field of view of the RU. When a RU requests wireless power from the GU, the GU can initiate wireless power transfer. If the RU is unable to achieve a threshold level of power, then the RU will communicate this to the GU and a determination can be made that the RU is not within the field of view of the GU. In several embodiments, the initial wireless power focusing can be performed using a lower power setting for the elements in the antenna array of the FU to provide safe operation while it is uncertain whether an obstruction exists between the GU and the RU. In a number of embodiments, the initial wireless power focusing is performed with a small subset of the elements to achieve the same result. When a determination is made that the RU is within the field of view of the GU and is unobstructed, then the GU can proceed with wireless power transfer with the RU by performing a focusing process to adjust its power transfer settings to increase efficiency.

Figure 4:
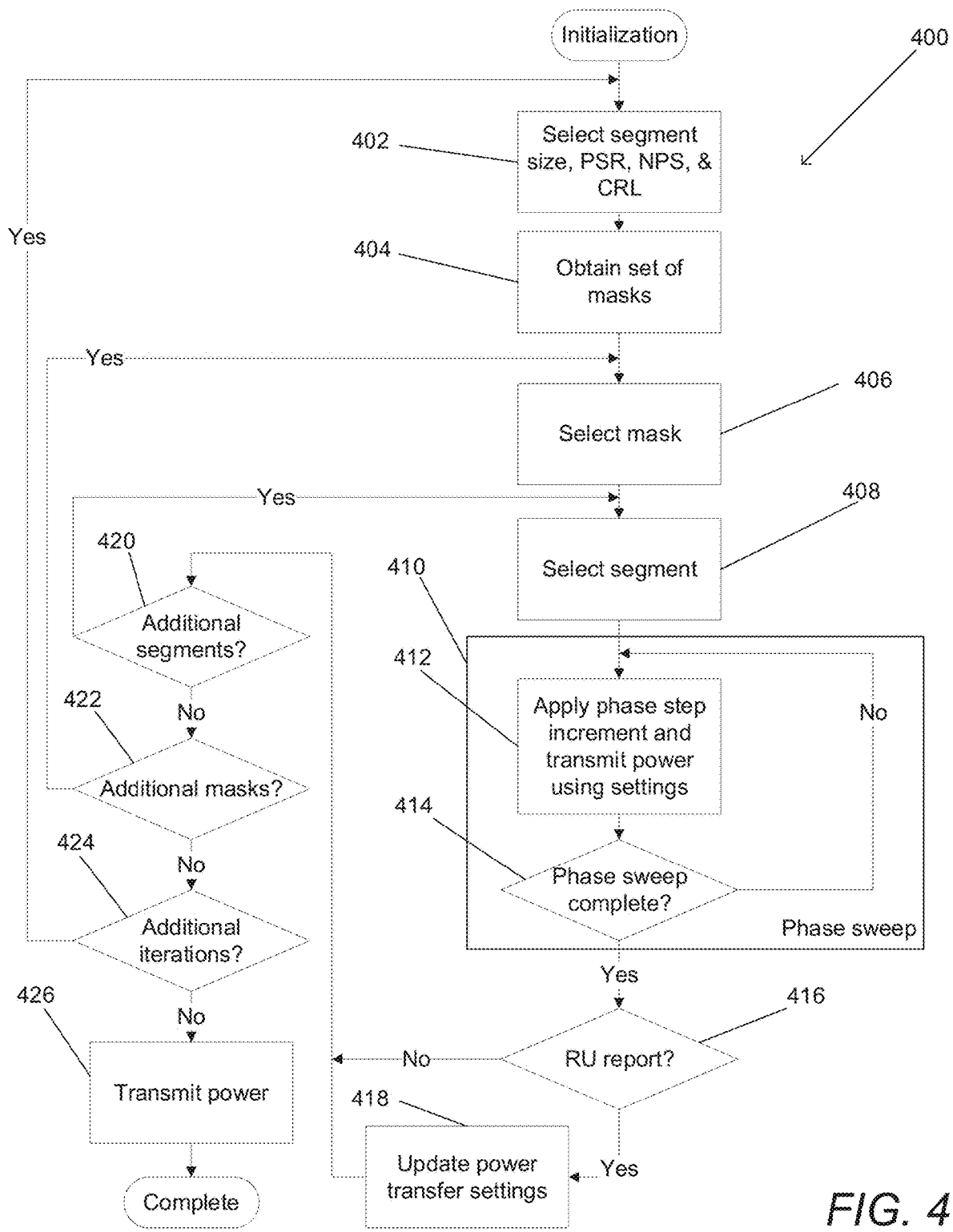
FIG. 4 illustrates a focusing process that determines phase offsets for elements in an antenna array based upon measurements of received power reported by at least one RU in accordance with an embodiment.

A focusing process that determines phase offsets for elements in an antenna array based upon measurements of received power reported by at least one RU in accordance with an embodiment of the invention is illustrated in FIG. 4. The focusing process 400 is initialized by selecting an initial phase state for the elements in an antenna array and measuring received power using at least one RU based upon the initial phase state. In addition, an initial segment size and shape, an initial phase sweep range (PSR), an initial phase step increment or number of phase steps (NPS), and a length of the communication run length (CRL) are selected (402). A set of masks appropriate to the selected segments can also be obtained (404) and a first mask is selected (406). In a number of embodiments, the masks are pre-generated and retrieved from memory. In several embodiments, the masks are generated based upon the segment size and shape.

A set of phase sweeps can be performed with respect to the elements in the GU array using the selected mask. In several embodiments, the phase sweeps are performed separately with respect to different segments of the array. A first segment is selected (408) based upon the initial phase step increment. A phase sweep is performed (410) with respect to the elements in the segment in a manner determined based upon the mask, the phase sweep range, and the phase step increment.

In the illustrated embodiment, the phase sweep involves applying (412) phase step increments to the phases of the elements within the segment in accordance with the selected mask. The process of incrementing the phases of the elements within the segment in accordance with the selected mask continues until a determination (414) is made that the phase sweep of the selected phase sweep range is complete. When the phase sweep is complete, the process determines (416) whether a report has been received from a RU providing information regarding received power during previous phase sweeps. In a number of embodiments, the RU provides a report of the received power for each of the different power transfer settings used during the phase sweep. In several embodiments, the RU simply identifies the power transfer setting in each sweep that yielded the highest received power. As can readily be appreciated, the particular information reported by the RU to the GU is largely dependent upon the requirements of a given application.

When the GU receives a report from the RU, the GU uses the reported received power information to update (418) the phase settings for the elements that have previously been swept. The process then selects new segments until a determination (420) is made that a phase sweep has been performed in accordance with the selected mask on all segments of the antenna array. At which point, the process selects additional masks and repeats the process of performing phase sweeps with respect to each segment in accordance with the selected mask until a determination (422) is made that there are no additional masks.

When each mask in the initial set of masks has been used, the process can then perform another iteration selecting (402) a new segment size and shape, a new phase sweep range, and a new phase increment step. A new set of masks is obtained (404) based upon the new segment size and shape and phase sweeps can be performed on the new segments in accordance with the new set of masks and based upon the phase new sweep range and phase increment step. As noted above, focusing processes in accordance with many embodiments of the invention have a tendency to proceed by utilizing smaller phase increment steps and larger segments. As can readily be appreciated, the specific manner in which the segment sizes and are selected during the focusing process, the specific masks that are utilized, and/or the manner in which the phase sweep ranges, and/or phase step increments are modified during successive iterations are largely dependent upon the requirements of specific applications. The phase sweeps continue until a determination (424) is made that the focusing process is complete. At which point, the GU can be configured (426) using the power transfer settings generated by the focusing process. As can readily be appreciated, the GU and the RU can be free to move with respect to each other. Therefore, focusing processes in accordance with many embodiments of the invention can continue to monitor reports of received power from a RU and to resume iterations of phase sweeps when a drop in received power is observed (likely indicating relative movement between the GU and the RU).

As can readily be appreciated, the process illustrated in FIG. 4 includes a series of nested iterative loops that could be nested in different ways. For example, focusing processes in accordance with a number of embodiments apply phase sweeps to each segment using the complete set of masks before moving on to the next segment. Indeed, the ordering of the steps of the focusing processes described above with reference to FIG. 4 can be varied as appropriate to the requirements of specific applications. Furthermore, processes for predicting power transfer settings based upon the location in 3D space of a RU such as (but not limited to) those discussed in U.S. Provisional Application Ser. No. 62/770,660 entitled "Dynamic Volumetric Refocusing of Arrays" and filed Nov. 21, 2018 and U.S. patent application Ser. No. 16/691,598 entitled "Dynamic Volumetric Refocusing of Arrays" and filed Nov. 21, 2019, the disclosures of which are incorporated by reference herein in their entirety, can be used to very quickly calculate an initial set of power transfer settings (e.g. phase state) to be used immediately and/or in conjunction with subsequent application of a focusing process similar to the processes described above with respect to FIG. 4 and configured to accommodate the fact that the initial power transfer settings are likely close to optimal. In a number of embodiments, a GU that selects an initial estimate of power transfer settings based upon an estimated location of a RU can perform a focus process that emphasizes fine adjustment by utilizing small PSRs and phase step increments. Accordingly, such processes likely will select large segments and/or segments sizes that encompass the entire array during phase sweeps to achieve increased variation in dynamic range with fine adjustment of the phase settings.

In a number of embodiments, a focusing process similar to any of the processes described above with reference to FIG. 4 can be performed to initially focus a wireless power transfer system in accordance with an embodiment of the invention. As power is being delivered to at least one RU, the at least one RU can monitor received power. In the event that a decrease in received power is observed (e.g. below a threshold), then the wireless power transfer system can initiate a refocusing process.

As can readily be appreciated, the amplitude and/or phases determined for the elements during the focusing process correspond to a particular point or region in 3D space (or multiple points when multiple beams are formed). A decrease in received power at a particular RU likely is a result of movement of one or both of the RU and/or GU. Accordingly, knowledge concerning a 3D location associated with the amplitude and/or phases determined during the focusing process can be utilized to perform a guided refocusing process involving a search of amplitude and/or phase states corresponding to locations in 3D space proximate the location identified during the focusing process. In certain embodiments, lookup tables and data structures that are structured or indexed in a manner that can facilitate location based searches (e.g. Bk-trees) can be utilized to map locations in 3D space proximate the location identified during the focusing process to specific amplitude and/or phase states. In certain embodiments, the guided search can be performed in a manner that accounts for the temperature of the array of RF power sources in addition to the most recent location of the RU. For example, lookup tables and/or indexes can be utilized that index to specific amplitude and/or phase states based upon both a 3D location and a temperature. As can readily be appreciated, any of a variety of data structures and/or factors can be considered in addition to the most recent location of the RU in performing a guided refocusing process as appropriate to the requirements of specific applications in accordance with various embodiments of the invention.

The antenna array of the GU can be controlled to sequence through identified amplitude and/or phase states and measurements of received power can be made at the RU as the GU progresses through the sequence. In several embodiments, a report received from the RU can identify the amplitude and/or phase state that resulted in the highest received power. In a number of embodiments, the refocusing process can simply utilize the amplitude and/or phase state that maximizes power (e.g. assuming the received power exceeds a threshold). In certain embodiments, the guided refocusing process can utilize information concerning the amplitude and/or phase state that maximizes received power to perform an additional process to refine the amplitude and/or phase state and maximize the received power without needing to perform comprehensive sweeps of all possible combinations of amplitude, phase, and/or polarization states such as (but not limited to) a gradient descent process.

While specific processes are described above for refocusing a wireless power transfer system following detection of a reduction in received power at a RU, any of a variety of processes can be utilized to refocus a wireless power transfer system in accordance with various embodiments of the invention including (but not limited to) processes that repeat the focusing process, processes that utilize incomplete bases to perform a focusing process, processes that utilize an incomplete search of a set of bases to perform a focusing process, and/or processes that utilize any of a variety of techniques to perform a search of the amplitude and/or phase space based upon knowledge of the most recently observed spatial location of the RU and/or utilizing additional information collected concerning the motion of the RU from sensors including (but not limited to) inertial measurement units, accelerometers, simultaneous location and mapping (SLAM) modules and/or any other sensor system capable of estimating location and/or movement.

While specific focusing processes are described above with respect to FIG. 4, any of a variety of processes for focusing wireless power transfer including (but not limited to) processes that perform the iterations outlined above in different orders and/or receive reports from RUs at different stages in the process, processes that use a single set of masks, processes that do not divide the array up into segments, processes that do not change the segment size during the focusing process, and/or processes that do not change the phase sweep range during the calibration can be utilized as appropriate to the requirements of given applications in accordance with various embodiments of the invention. In order to provide additional context for the specific manner in which focusing processes in accordance with various embodiments of the invention can be utilized, communication between a GU and RU during a focusing process are discussed below prior to providing a more detailed discussion of calibration and the generation of basis masks.

Communication During Focusing Processes

The time synchronization between the GU and RU can play an important role in the overall performance of a power transfer system, as it can affect the ability to associate which power transfer settings used by the GU correspond to which received power state on the RU. This can become more important, when the CRL is long. A variety of methods can be used to achieve synchronization in accordance with various embodiments of the invention. In several embodiments, the GU can generate a SYNC pulse to indicate the beginning of a sweep and/or sequence of sweeps. Such SYNC pulse can be generated by different means, such as, power cycling the power amplifiers to temporarily drop the power level on the RU to signal the beginning of sequence of phase settings. Another exemplary way to generate such pulses is by changing the phase setting on the GU. For instance, a checkered alternating basis (e.g., lower right basis functions in FIG. 9 and FIG. 10), where the phase of one group is shifted with respect to the other half would produce a lower power setting when the GU setting was previously producing a reasonable amount of power at the RU location. Other types of SYNC signal generation can be used for different scenarios (e.g., near/far, high/low power, . . . ) as appropriate to the requirements of specific applications. In general, the SYNC mechanism and the type of signal can be different for different iterations or even within iterations.

To achieve a real time tracking system, any additional overhead in the optimization process ideally should be minimized. An exemplary alternative to using SYNC sequences and the associated timeslots is to utilize specific timestamps. In this approach, both the GU and RU possess independent time keepers, which are synchronized by SYNC pulse before optimization (or each iteration). In a number of embodiments, all the events during optimization (e.g., iteration, phase settings, ADC samplings, . . . ) are time stamped and recorded for post processing. SYNC pulses can be periodically transmitted by the GU, RU, or both to maintain the desired level of synchronization. GPS based timing synchronization can also be utilized as yet another exemplary alternative to achieve timing synchronization. While various processes for achieving synchronization between a GU and RU are described above, it should be appreciated that any mechanism for reconciling reports of received power at the RU with the power transfer settings utilized by the GU during sweeps can be utilized as appropriate the requirements of specific applications in accordance with various embodiments of the invention.

Figure 5:
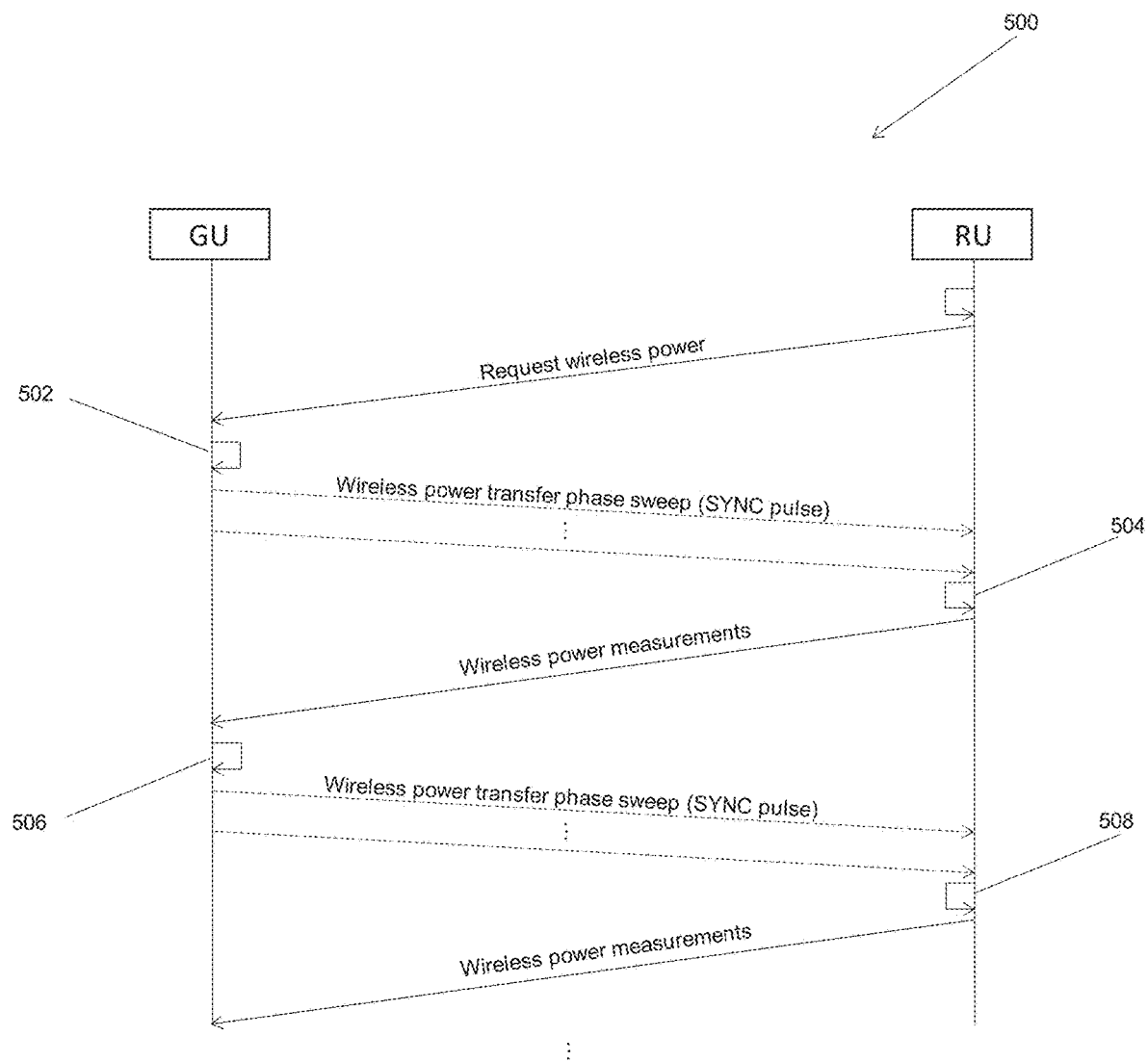
FIG. 5 is a communication diagram illustrating communication between a GU and a RU during wireless transfer in accordance with an embodiment of the invention.

Communication between a GU and a RU during wireless transfer in accordance with an embodiment of the invention is shown in the communication diagram shown in FIG. 5. During the wireless power transfer session 500, a RU that has already established a wireless connection with a GU determines that wireless power is required and transmits a request to the GU for wireless power. The GU determines (502) initial power transfer setting and then commences wireless power transfer. In the illustrated embodiment, a focusing process is performed and the GU signals the commencement of one or more sweeps by using its antenna array to transmit a SYNC pulse in a manner similar to one of the various processes described above. The RU can detect the SYNC pulse and record measurements of received power as the sweep is performed. The recorded measurements are processed (504) and a report generated that is transmitted by the RU to the GU. In several embodiments, the RU reports a time slot during the sweeps at which the highest received power was measured. In a number of embodiments, the RU reports the time slot at which the highest received power was measured in each sweep. In certain embodiments, the RU reports the received power measurements that were recorded during the one or more sweeps. As can readily be appreciated, the specific information that is reported by the RU largely depends upon the requirements of specific applications.

When the GU receives a report from the RU, the GU can perform updates (506) to its power transfer settings and proceed with an additional sweep, the commencement of which is indicated by a SYNC pulse. The RU continues to make measurements during the sweep and generates a (508) a second report that is transmitted to the GU. The process updating the power transmission settings, performing sweeps, recording received power, and providing reports continues until a desired set of power transfer settings are maximized. In certain scenarios, the desired power transfer settings are the power transfer settings that yield the maximum received power at the RU. In a number of embodiments, any of a variety of factors can be considered in determining desired power transfer settings.

While specific exchanges of messages are described above with reference to FIG. 5, any of a variety of sequences of communications can be utilized to exchange information and obtain synchronization between a GU and a RU as appropriate to the requirements of specific applications in accordance with various embodiments of the invention. While the processes described with respect to FIG. 5 utilize a combination of exchange of digital data transmitted using a first wireless communication modality and the transfer of SYNC pulses using the antenna array utilized, wireless transfer systems can rely exclusively on the use of pulses transmitted by the antenna array to transmit data between the GU and the RU and backscattering of data by the RU to transmit data from the RU to the GU and/or utilize additional or alternative communication modalities to exchange information and/or achieve synchronization between one or more GUs and one or more RUs as appropriate to the requirements of specific applications in accordance with various embodiments of the invention. Furthermore, a RU in accordance with various embodiments of the invention can provide additional or alternative information to received power measurements. In several embodiments, the RU can obtain measurements including (but not limited to) phase and/or power received at individual rectennas in a rectenna array and can provide these measurements and/or information derived from these measurements to assist a GU with determining appropriate power transfer settings. RUs that provide information concerning characteristics of signals received at individual rectenna elements in a rectenna array in accordance with various embodiments of the invention are discussed further below.

RU Feedback

Figure 6:
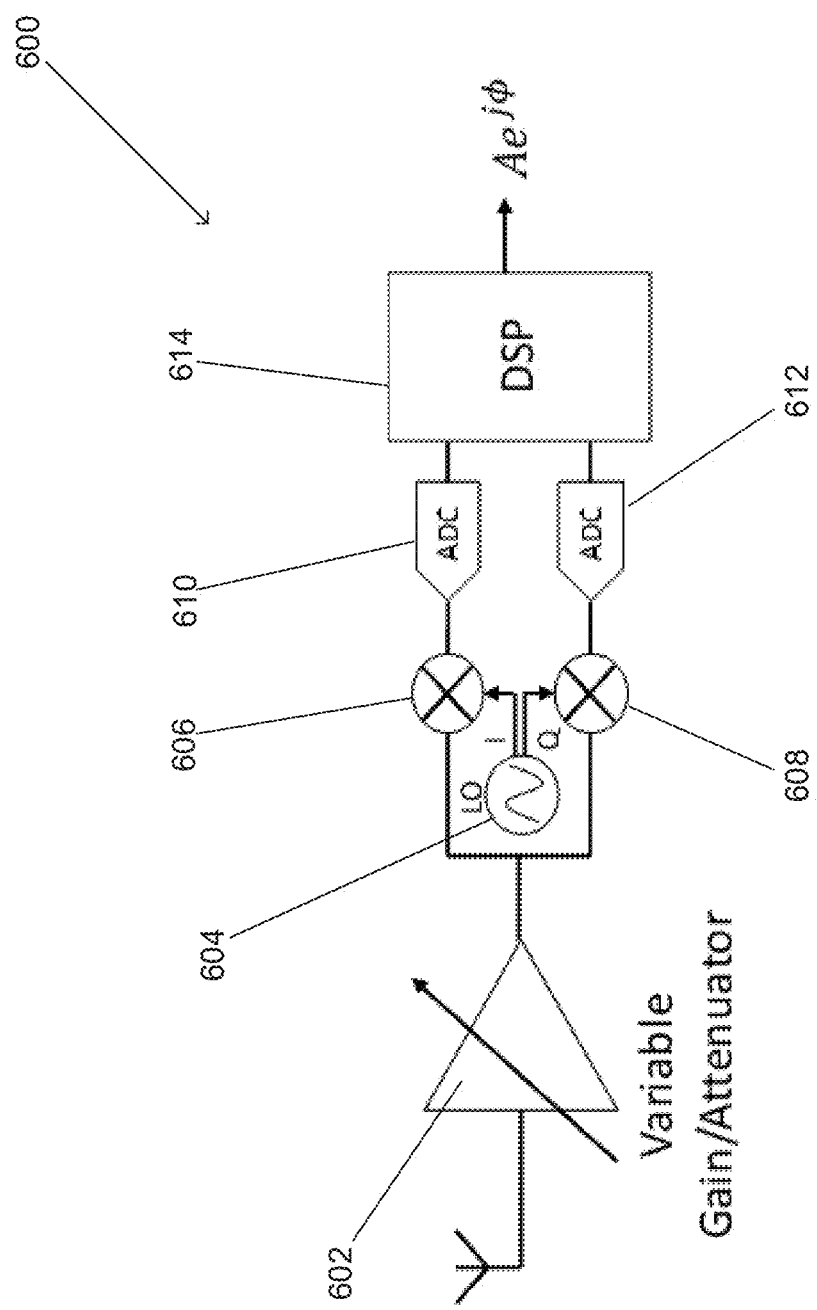
FIG. 6 shows a RU incorporating a coherent receiver in accordance with an embodiment of the invention.

In many embodiments, RUs incorporate a coherent RF receiver tuned at the frequency of operation of a GU from which the RU is requesting wireless power. In some embodiments, the receiver uses the same antenna to perform RU power recovery and measure amplitude and phase of the received RF signal. In other embodiments, the RU can use separate dedicated antennas to perform power recovery and to measure the amplitude and phase of received RF beam A RU incorporating a coherent receiver in accordance with an embodiment of the invention is shown in FIG. 6. In the illustrated embodiment, the RU includes an antenna element that provides a signal to a variable gain amplifier. The amplified signal is then mixed using a local oscillator signal having the same frequency signal as the carrier of the transmitted power signal in order to obtain in-phase and quadrature components that are sampled by analog to digital converters. The digitized samples are then provided to a digital signal processor, which can then determine the amplitude and phase of the received signal. As is discussed further below, the amplitude and phase information can then be fed back to the GU and/or used to generate frequency offsets to apply to specific elements within the antenna array of the GU.

In the illustrated embodiment, at each $k^{th}$ measurement, the received signal amplitude, $A_k$, and phase $\phi_k$, can be written as:

$$A_k e^{j\phi_k} = \sum_{n=1}^{N} a_n e^{j(\alpha_n - \theta M_{kn})}$$

where $a_n$ and $\alpha_n$ are the amplitude and phase of RF signal received from element n of GU, respectively, $\theta$ is the phase step used to change the phase of the elements and $M_{kn}$ is the k,n element of mask used. Assuming the power received from each element to the RU is the same and using $\theta = \pi$, the equation simplifies to:

$$A_k e^{j\phi_k} = a \sum_{n=1}^{N} (-1)^{M_{kn}} e^{j\alpha_n}$$

Or its matrix equivalence of:

$$A = aMa$$

Given that M is an invertible matrix (it is full rank), $\alpha$ can be simply calculated:

$$a = \frac{1}{a} M^{-1} A$$

Thus, the RF phase of each GU element at RU, $\alpha_n$, can be calculated. In order to receive maximum power, all GU elements should be modified such that they all produce the same phase (nominally zero) at the receiver. This can be simply done by subtracting $a_n$ from corresponding elements of GU. In the example described above, only N measurements were performed. In several embodiments, a greater number of measurements with a larger matrix M is utilized. In a number of embodiments, different values of θ are utilized. In addition, a least square or any other linear solving method to obtain an estimate of $a_n$. Accordingly, it should be appreciated that any of a variety of techniques can be utilized to provide feedback information that can be utilized by a GU to determine the power transfer settings to utilize as appropriate to the requirements of specific applications in accordance with various embodiments of the invention.

While specific wireless power transfer systems are described above with reference to FIGS. 4-12, wireless power transfer systems in accordance with various embodiment of the invention can be constructed using any components and/or fabrication processes that can be utilized in the construction of an wireless power transfer systems. As stated above, focusing processes in accordance with various embodiments of the invention can be utilized to ascertain power transfer settings for elements in wireless power transfer systems irrespective of whether the specific architecture employed within the GU(s) and/or RU(s) within the wireless power transfer system. Specific focusing processes that can be utilized to determine power transfer settings for use in wireless power transfer systems and techniques for generating basis masks in accordance with certain embodiments of the invention as discussed further below.

Focusing Processes Using Basis Masks

Referring again to FIG. 4, a high level process 400 for determining phase state calibration information in an OPA including (but not limited to) any of the OPA TX and OPA RX systems described above. A key feature of focusing processes in accordance with many embodiments of the invention is performing coordinated phase sweeps of groups of phase shifters. Basis masks can be utilized to determine the phase sweeps applied to individual phase shifters at different stages during the focusing process. As is discussed in more detail below, the characteristics of the basis mask can determine how likely a focusing process is to identify an optimal or desired phase state and/or the speed with which such a phase state can be identified by the focusing process.

Basis Masks

The phase and amplitude settings of an N-element array can be considered to be a complex N-dimensional basis for a vector space of the GU settings. If only phases were to be varied, the vector space will be real and corresponds to all of the potential phase states of the GU settings. The vector space of the phase state space of the GPU settings can be spanned using different sets of basis functions. Many embodiments of the invention utilize an incomplete set of basis functions (i.e. a set of basis functions that do not span the entire phase state space). In certain applications, however, mutually independent basis functions are utilized that enable evaluation of the entire phase state space of the GU settings. As is discussed further below, basis masks can be generated using a set of basis functions. While much of the discussion that follows relates to the generation of basis masks for GU settings that incorporate regular two-dimensional arrays of elements, it is important to appreciate that basis masks can be generated and applied during wireless power transfer processes to any arbitrary arrangement of N elements including (but not limited to) one dimensional arrays, and sparse arrays.

Figure 7:
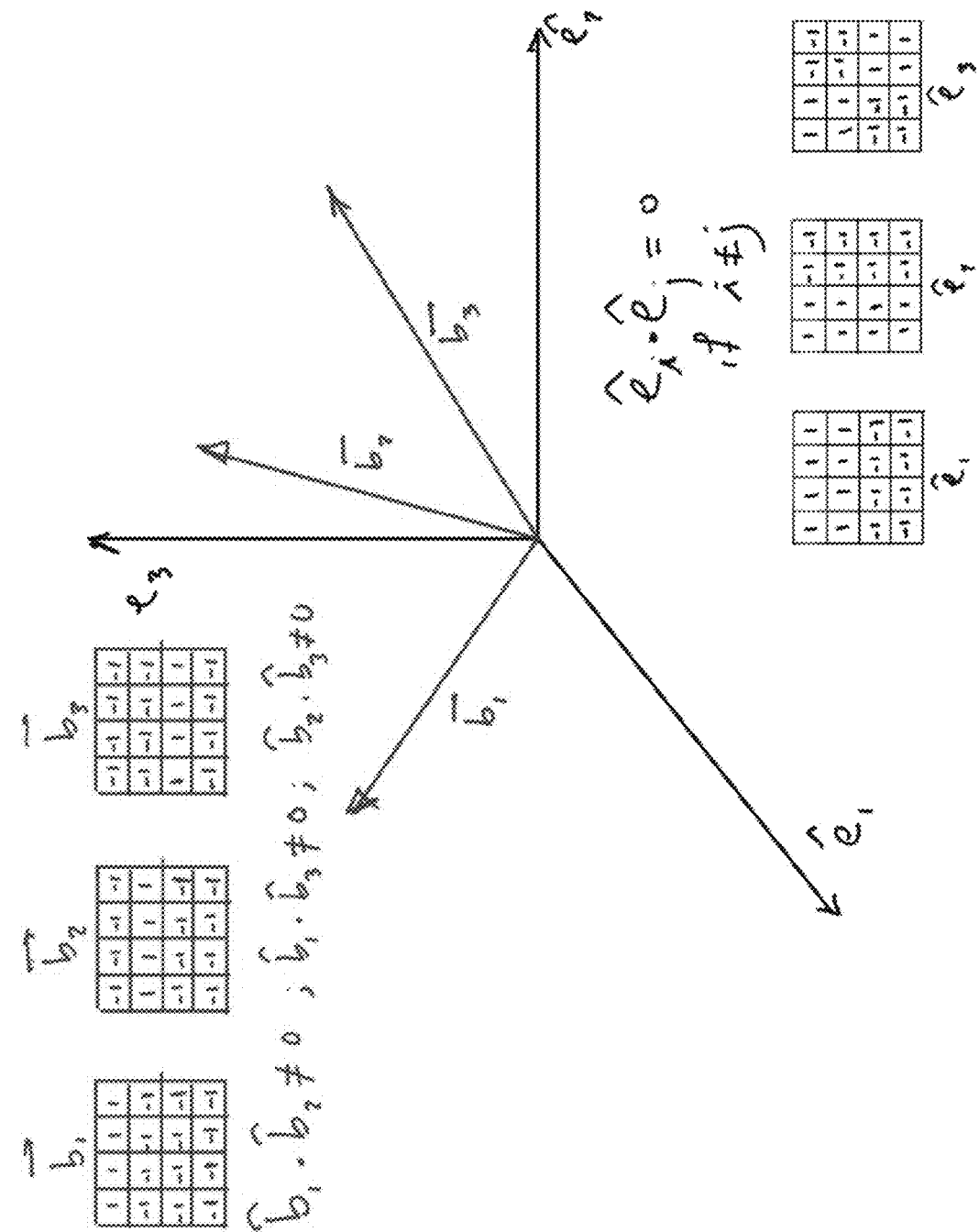
FIG. 7 conceptually illustrates a simple example of the manner in which basis functions can be utilized to generate basis masks in accordance with an embodiment of the invention.

A simple example of the manner in which basis functions can be utilized to generate basis masks is conceptually presented in FIG. 7. Three independent basis masks, $\overline{b_1}$, $\overline{b_2}$ and $\overline{b_3}$ are illustrated. It is noteworthy that the exemplary basis, b, is not orthogonal. In this context, orthogonality is defined as the inner product of two masks being zero. The inner product of masks a and b is defined as:

$$a \cdot b = \sum_i \sum_j a_{ij} b_{ij}$$

with elements at −1 and 1 in this example. As noted above, masks are not limited to elements of −1 and 1, but can include any values appropriate to the requirements of a particular application.

There are additional benefits to using an orthogonal basis to span the phase state space of a particular GU. An example of three orthogonal masks is also shown in FIG. 7, where 2-dimensional basis functions $\hat{e}_1$, $\hat{e}_2$ and $\hat{e}_3$ are orthogonal. The dimensionality of the phase state space is N, meaning that N basis vectors are needed to completely span the space. Although it is possible and certainly not excluded in this disclosure to use an incomplete basis, there are benefits to a complete basis that spans the entire vector space of optimization parameters. As an incomplete basis could result in suboptimal energy focusing and thereby reduce wireless power transfer. This is because parts of the design space would remain unexplored. Various basis functions are possible, however different basis functions are often preferred depending on the optimization scenario. For example, a large dynamic range can be generated (e.g. for the case where the RU is far from the GU, has an undesirable orientation, or is partially obstructed by an absorber) by selecting a set of basis functions that vary the phase of a large number of element phases during a phase sweep. The upper bound for this is varying the phase of half of the elements with respect to the other half, which produces the maximum dynamic range with the phase sweep. Such large variations, resulting from multiple element fluctuations can provide a large dynamic range that is useful in assessment of the preferred phase settings for the elements of the GU.

One exemplary embodiment of the use of basis masks involves sweeping the phase of one group of elements (designated by color red in FIG. 3) relative to the other elements (for instance, the blue) for each of the 2-dimensional basis masks. In many embodiments, the phase shift may be done differentially (with one group moving in the opposite direction of the other group) (masks with element at +1 or −1, which can be referred to as signed masks), or in a one-sided fashion, where only one group of phases are swept without the other group moving (with mask elements at 0 or 1 hereafter referred to as binary masks). Application of a binary mask is conceptually illustrated in FIG. 8.

Orthogonal Basis Masks

As mentioned above, there are certain benefits to using masks that are substantially orthogonal. One of those advantages is the smaller projection of optimization of phase sweeps using a first mask compared to phase sweeps using the other masks (theoretically zero for a perfectly orthogonal basis). Furthermore, the use of orthogonal basis masks can enable identification of an optimal calibration phase state to be done in batch without the need for frequent updates to each element's phase setting, which can significantly reduce the number of communication updates between an OPA and an OPA controller.

Generating Complete Mask Sets

Figure 9:
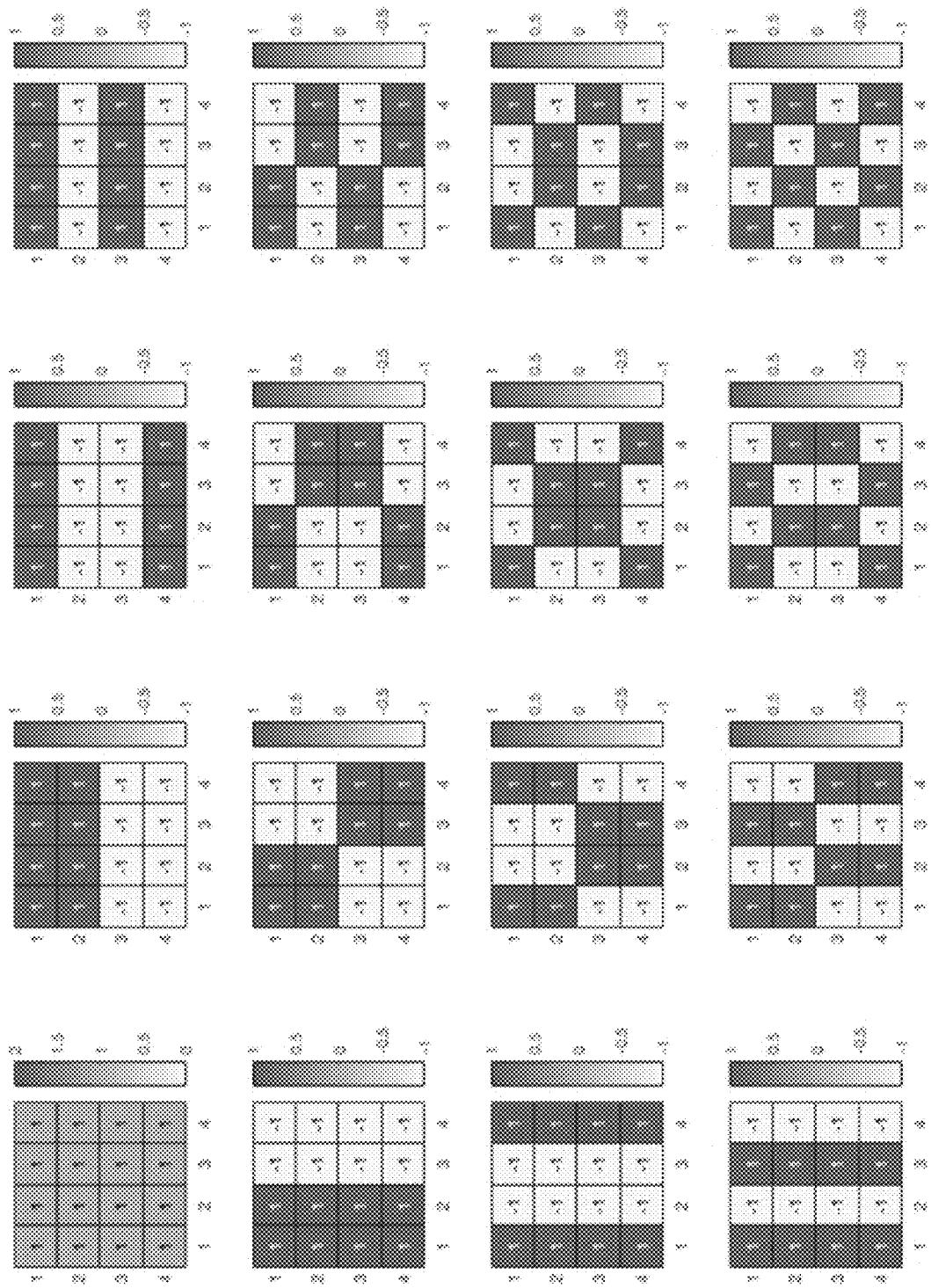
FIG. 9 illustrates a complete and orthogonal mask set for a 4×4 array.

Using a complete mask set can enable a wireless power transfer process in accordance with an embodiment of the invention to get closer to the target optimization point with no blind spots in the optimization space. One such exemplary complete and orthogonal mask set is shown in FIG. 9 for a 4×4 array. Even if a random selection of elements were to be phase swept at the same time, the system would be prone to incompleteness in such an approach, meaning certain states or combinations of them can be missed, often resulting in (substantially) suboptimal performance. It should be emphasized that focusing processes in accordance with many embodiments of the invention use incomplete, or non-orthogonal masks for any specific applications. As can readily be appreciated, the specific characteristics of the mask sets that are utilized in a particular wireless power transfer process in accordance with various embodiments of the invention are largely dependent upon the requirements of practical applications.

The exemplary mask-set of FIG. 9 can be generated using two Hadamard matrices. In general, a perfectly orthogonal basis mask set of size M×N can be generated using Hadamard matrices of size M×M and N×N. The orthogonal basis mask set can be constructed either analytically or by computers. The Hadamard matrices used to generate the 2-dimensional mask set of size 4×4 can be one and the same, because M=N=4. The Hadamard Matrix (with rows reordered) is:

$$H_4 = \begin{bmatrix} 1 & 1 & 1 & 1 \\ 1 & 1 & -1 & -1 \\ 1 & -1 & -1 & 1 \\ 1 & -1 & 1 & -1 \end{bmatrix}$$

The individual masks are generated by preforming matrix multiplication of a column of the M×M matrix by a row of the N×N matrix to generate a mask of size M×N.

Generating Quasi-Orthogonal Masks

Figure 10:
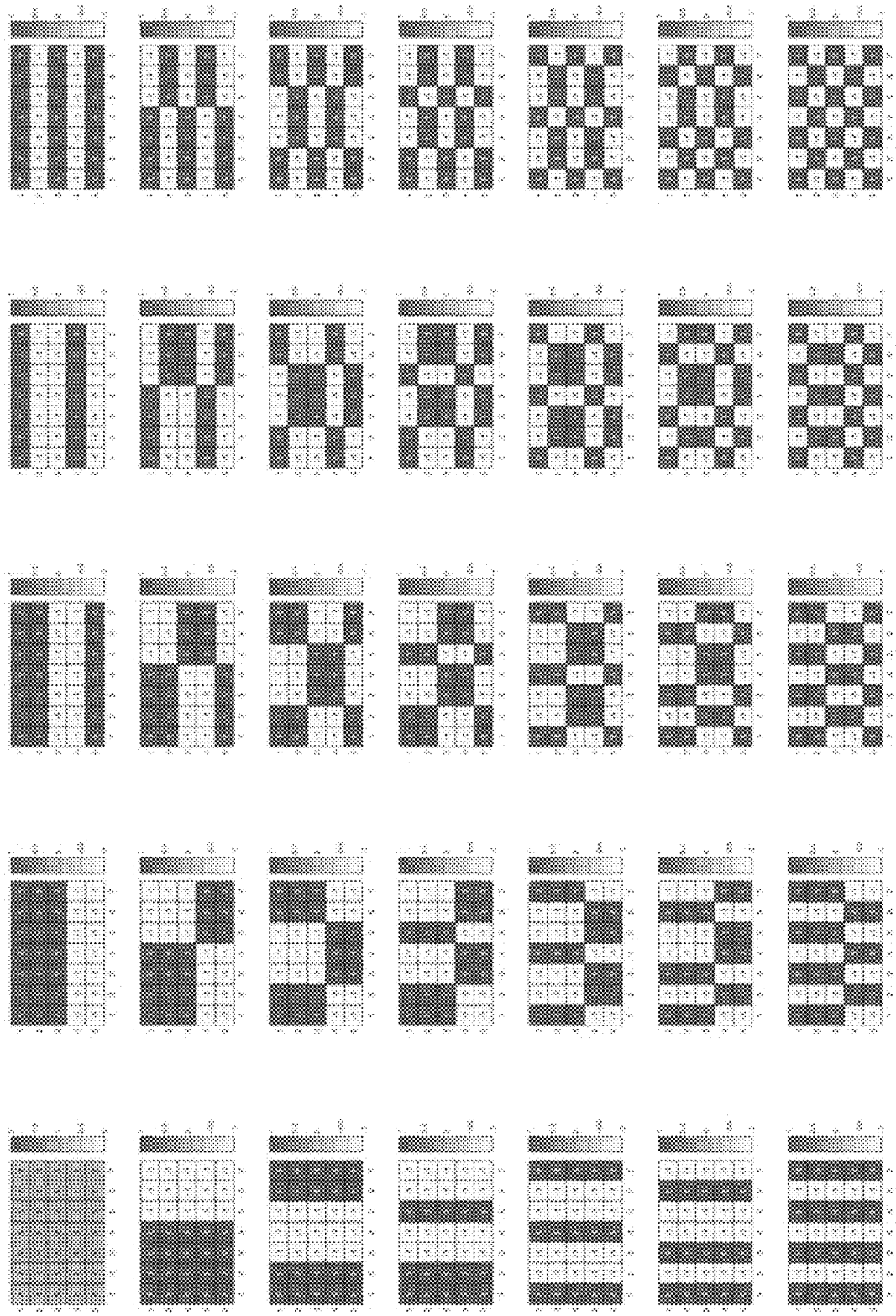
FIG. 10 illustrates a mask set for a 5×7 array.

The two matrices used do not have to be the same size or for that matter are not perfectly orthogonal. An example of this is shown in FIG. 10 for masks of size 5×7. In this example, what can be referred to as a quasi-orthogonal basis is utilized. This can be generated using what can be referred to as pseudo-Hadamard matrices. The basis B is close to orthogonal if the product of $B.B^T$ is close to N×M.I, where I is the identity matrix. Namely, the nondiagonal elements of the product of $B.B^T$ should be much smaller than the diagonal. Quasi-orthogonal mask sets can be implemented as elements of 1 and −1, or 0 and 1 (with an XOR operation) or any other sets of values including signed integers, real numbers, complex numbers, to name a few possibilities. Furthermore, amplitude settings could be represented as imaginary numbers, such that every complex number within a defined range for each setting represents a unique phase and amplitude setting.

Using orthogonal or quasi-orthogonal masks can facilitate evaluation of the optimum phases for multiple masks independently and sequentially without the need to update the GU phase settings after each phase sweep of the active radiators under the active mask. This can be particularly useful in the presence of latency or speed limitations for communications. The orthogonal and quasi-orthogonal masks allow the phase sweeps to be done independently and the aggregate result effectuated after a predefined number of masks have gone through the phase sweep. As discussed above, the number of masks swept between communications from a RU of the best power readout (i.e. the CRL) can be as low a one with no fundamental upper bound. The quality of the basis can determine the practically optimum CRL and the nonideality of the system (e.g., due to coupling or pulling) may present practical limits to the maximum CRL used.

Additional Methods for Generating Masks

In a number of embodiments of the invention, a variety of alternative methods are utilized to generate suitable orthogonal or orthonormal sets or masks such as (but not limited to) the Gram-Schmidt or the modified Gram-Schmidt orthogonalization process (which are based on projections. These processes start out with a set that completely spans the space of possible power transfer settings and calculate an orthonormal basis. Other possible methods such as use of the Householder transformation (which are based on reflections), or Givens rotations can also be utilized.

In certain embodiments, it may be beneficial to use different amounts of phase shifts for differently located elements that correspond to certain physical operations or movements of a beam from the GU to the RU. In several embodiments, a mask set is chosen for the focusing process that has linear gradients of phase shifts across the array in the x- and y-directions. Physically, these can correspond to steering a beam along these directions and could, for example, be useful when the focusing process is, for example, not run through all mask sets (e.g. if small corrections should be made for small RU movements along these directions). For an array of size 4×4, the following can be chosen as the initial basis vectors (they also happen to be orthogonal, which preserves them under the Gram-Schmidt process) and for the remaining basis vectors choose different, individual antennas, such that the starting masks are:

$$\begin{pmatrix} 1 & 1/3 & -1/3 & -1 \\ 1 & 1/3 & -1/3 & -1 \\ 1 & 1/3 & -1/3 & -1 \\ 1 & 1/3 & -1/3 & -1 \end{pmatrix}, \begin{pmatrix} 1 & 1 & 1 & 1 \\ 1/3 & 1/3 & 1/3 & 1/3 \\ -1/3 & -1/3 & -1/3 & -1/3 \\ -1 & -1 & -1 & -1 \end{pmatrix},$$

$$\begin{pmatrix} 1 & 0 & 0 & 0 \\ 0 & 0 & 0 & 0 \\ 0 & 0 & 0 & 0 \\ 0 & 0 & 0 & 0 \end{pmatrix}, \begin{pmatrix} 0 & 0 & 0 & 0 \\ 1 & 0 & 0 & 0 \\ 0 & 0 & 0 & 0 \\ 0 & 0 & 0 & 0 \end{pmatrix}, \begin{pmatrix} 0 & 0 & 0 & 0 \\ 0 & 0 & 0 & 0 \\ 1 & 0 & 0 & 0 \\ 0 & 0 & 0 & 0 \end{pmatrix},$$

$$\begin{pmatrix} 0 & 0 & 0 & 0 \\ 0 & 0 & 0 & 0 \\ 0 & 0 & 0 & 0 \\ 1 & 0 & 0 & 0 \end{pmatrix}, \begin{pmatrix} 0 & 1 & 0 & 0 \\ 0 & 0 & 0 & 0 \\ 0 & 0 & 0 & 0 \\ 0 & 0 & 0 & 0 \end{pmatrix}, \begin{pmatrix} 0 & 0 & 0 & 0 \\ 0 & 1 & 0 & 0 \\ 0 & 0 & 0 & 0 \\ 0 & 0 & 0 & 0 \end{pmatrix},$$

$$\begin{pmatrix} 0 & 0 & 0 & 0 \\ 0 & 0 & 0 & 0 \\ 0 & 1 & 0 & 0 \\ 0 & 0 & 0 & 0 \end{pmatrix}, \begin{pmatrix} 0 & 0 & 0 & 0 \\ 0 & 0 & 0 & 0 \\ 0 & 0 & 0 & 0 \\ 0 & 1 & 0 & 0 \end{pmatrix}, \begin{pmatrix} 0 & 0 & 1 & 0 \\ 0 & 0 & 0 & 0 \\ 0 & 0 & 0 & 0 \\ 0 & 0 & 0 & 0 \end{pmatrix}, \begin{pmatrix} 0 & 0 & 0 & 0 \\ 0 & 0 & 1 & 0 \\ 0 & 0 & 0 & 0 \\ 0 & 0 & 0 & 0 \end{pmatrix},$$

$$\begin{pmatrix} 0 & 0 & 0 & 0 \\ 0 & 0 & 0 & 0 \\ 0 & 0 & 1 & 0 \\ 0 & 0 & 0 & 0 \end{pmatrix}, \begin{pmatrix} 0 & 0 & 0 & 0 \\ 0 & 0 & 0 & 0 \\ 0 & 0 & 0 & 0 \\ 0 & 0 & 1 & 0 \end{pmatrix}, \begin{pmatrix} 0 & 0 & 0 & 1 \\ 0 & 0 & 0 & 0 \\ 0 & 0 & 0 & 0 \\ 0 & 0 & 0 & 0 \end{pmatrix}, \begin{pmatrix} 0 & 0 & 0 & 0 \\ 0 & 0 & 0 & 1 \\ 0 & 0 & 0 & 0 \\ 0 & 0 & 0 & 0 \end{pmatrix}.$$

In this example, the resulting mask set using a Gram-Schmidt orthogonalization would yield the (nearly) orthogonal masks $$\begin{pmatrix} 1 & 1/3 & -1/3 & -1 \\ 1 & 1/3 & -1/3 & -1 \\ 1 & 1/3 & -1/3 & -1 \\ 1 & 1/3 & -1/3 & -1 \end{pmatrix}, \begin{pmatrix} 1 & 1 & 1 & 1 \\ 1/3 & 1/3 & 1/3 & 1/3 \\ -1/3 & -1/3 & -1/3 & -1/3 \\ -1 & -1 & -1 & -1 \end{pmatrix},$$

$$\begin{pmatrix} 2.624 & -0.508 & -0.254 & 0 \\ -0.508 & -0.254 & 0 & 0.254 \\ -0.254 & 0 & 0.254 & 0.508 \\ 0 & 0.254 & 0.508 & 0.762 \end{pmatrix},$$

$$\begin{pmatrix} 0 & -0.337 & -0.047 & 0.243 \\ 2.742 & -0.209 & 0.081 & 0.371 \\ -0.371 & -0.081 & 0.209 & 0.449 \\ -0.243 & 0.047 & 0.337 & 0.627 \end{pmatrix},$$

$$\begin{pmatrix} 0 & -0.092 & 0.212 & 0.517 \\ 0 & -0.132 & 0.172 & 0.477 \\ 2.752 & -0.172 & 0.132 & 0.437 \\ -0.517 & -0.212 & 0.092 & 0.397 \end{pmatrix},$$

$$\begin{pmatrix} 0 & 0.210 & 0.559 & 0.908 \\ 0 & -0.047 & 0.303 & 0.652 \\ 0 & -0.303 & 0.047 & 0.396 \\ 2.562 & -0.559 & -0.210 & 0.140 \end{pmatrix},$$

$$\begin{pmatrix} 0 & 2.712 & -0.417 & -0.268 \\ 0 & -0.238 & -0.089 & 0.059 \\ 0 & 0.089 & 0.238 & 0.387 \\ 0 & 0.417 & 0.556 & 0.715 \end{pmatrix}, \begin{pmatrix} 0 & 0 & -0.118 & 0.033 \\ 0 & 2.912 & 0.011 & 0.162 \\ 0 & -0.011 & 0.140 & 0.291 \\ 0 & 0.118 & 0.268 & 0.419 \end{pmatrix},$$

$$\begin{pmatrix} 0 & 0 & 0.233 & 0.368 \\ 0 & 0 & 0.122 & 0.257 \\ 0 & 2.921 & 0.012 & 0.146 \\ 0 & -0.233 & -0.099 & 0.035 \end{pmatrix}, \begin{pmatrix} 0 & 0 & 0.667 & 0.8 \\ 0 & 0 & -0.267 & 0.4 \\ 0 & 0 & -0.133 & 0 \\ 0 & 2.667 & -0.533 & -0.4 \end{pmatrix},$$

$$\begin{pmatrix} 0 & 0 & 2.582 & -1.033 \\ 0 & 0 & -0.344 & -0.516 \\ 0 & 0 & 0.172 & 0 \\ 0 & 0 & 0.689 & 0.516 \end{pmatrix}, \begin{pmatrix} 0 & 0 & 0 & -0.585 \\ 0 & 0 & 2.885 & -0.370 \\ 0 & 0 & 0.021 & -0.154 \\ 0 & 0 & 0.236 & 0.062 \end{pmatrix},$$

$$\begin{pmatrix} 0 & 0 & 0 & 0.065 \\ 0 & 0 & 0 & -0.120 \\ 0 & 0 & 2.901 & -0.305 \\ 0 & 0 & -0.349 & -0.491 \end{pmatrix}, \begin{pmatrix} 0 & 0 & 0 & 0.899 \\ 0 & 0 & 0 & 0.164 \\ 0 & 0 & 0 & -0.572 \\ 0 & 0 & 2.453 & -1.308 \end{pmatrix},$$

$$\begin{pmatrix} 0 & 0 & 0 & 1.633 \\ 0 & 0 & 0 & -2.177 \\ 0 & 0 & 0 & -0.544 \\ 0 & 0 & 0 & 1.089 \end{pmatrix}, \begin{pmatrix} 0 & 0 & 0 & 0 \\ 0 & 0 & 0 & 1.217 \\ 0 & 0 & 0 & -2.434 \\ 0 & 0 & 0 & 1.217 \end{pmatrix}.$$

Different applications may require different properties from the mask sets used, and focusing processes in accordance with various embodiments of the invention can obtain the particular mask set appropriate for different applications or different operating conditions.

The above procedure can also be applied to amplitude settings to generate an orthogonal set where the imaginary components are treated as independent real components. In the case of amplitude settings, using noncomplete sets is in practice more useful compared to the set for phase settings, the reason being that knowledge of an amplitude reference typically exists that allows constraining the problem to cases useful in practical applications and, thus, limiting the search space. As an example, for a 2×2 array with a starting mask set:

$$\begin{pmatrix} i & -i \\ i & -i \end{pmatrix}, \begin{pmatrix} i & 0 \\ 0 & 0 \end{pmatrix}, \begin{pmatrix} 0 & 0 \\ i & 0 \end{pmatrix}, \begin{pmatrix} 0 & i \\ 0 & 0 \end{pmatrix},$$

a Gram-Schmidt orthogonalization would yield $$\begin{pmatrix} i & -i \\ i & -i \end{pmatrix}, \begin{pmatrix} 1.732i & -0.577i \\ -0.577i & -0.577i \end{pmatrix}, \begin{pmatrix} 0 & 0.816i \\ 1.633i & 0.816i \end{pmatrix}, \begin{pmatrix} 0 & 1.414i \\ 0 & -1.414i \end{pmatrix}$$

as an orthogonal mask set.

While a variety of processes are described above for generating mask sets, any of a number of different techniques can be utilized to generate masks sets for use in focusing processes as appropriate to the specific requirements of particular applications in accordance with various embodiments of the invention. The manner in which sweeps can be performed using masks in accordance with a number of different focusing processes in accordance with various embodiments of the invention are discussed further below.

Performing Phase Sweeps Using Basis Masks

As is discussed above, each of the basis masks defines different sets of elements to which a phase sweep is applied leading to received power variation at a RU (as in FIGS. 3 and 8). In each case, the RU monitors the received power as the phase is swept over a CRL and the communicates the received power to the GU. The GU can then use information concerning the received power at specific phase settings to configure the phase of elements during ongoing wireless power transfer. In several embodiments, the phase of the elements within each mask can be swept over an arbitrary number of steps and over different total phase sweep ranges (PSR) within different overall iterations of the focusing process. The number of phase steps (NPS) evaluated can be as low as two with no upper bound. A smaller number of phase steps (i.e., large phase step increments) can produce a smaller number of calibration signal measurements to be evaluated, which can result in a higher speed of operation and lower complexity in the detection. A smaller PSR can result in a subsection of the phase sweep range of a particular optical element being explored. In many embodiments, reductions in the PSR can occur in the later stages of the optimization, where the focusing process (through its automated operation) effectively performs fine tuning of the phase settings.

The mask sets do not need to be applied to the full size of the GU array. In a number of embodiments, the array is broken down into smaller segments, where within each segment the appropriate set of masks (possibly, but not necessarily, orthogonal or quasi-orthogonal) determines the manner in which phase sweeps are applied to particular elements of the array. The size and the number of the masks associated with each segment is smaller than the number of masks that ideally are required to identify an optimal phase state for the entire GU. For example, segments of size $M_s \times N_s$ can be phase swept using $M_s \times N_s$ masks per segment. This will result in smaller number of elements phase swept at any given time and fewer masks to sweep through during the focusing process. In this way, sweeps can be performed faster, but at the potential cost of lower phase variation dynamic range. This trade-off can be explored and utilized over the iterations (or recursions) of a focusing process in accordance with an embodiment of the invention by using different segmentation parameters. Segmentation of a GU array in accordance with an embodiment of the invention is conceptually illustrated in FIG. 11. In the illustrated embodiment, a segmentation of 4×6 is applied within a larger 16×12 array and a total of 24 masks is applied to each segment. As is discussed in detail, any of a variety of segment sizes can be chosen and, in many embodiments, the segment sizes can vary in combination with variations in phase step increments during a wireless power transfer process. Accordingly, wireless power transfer processes in accordance with various embodiments of the invention should be understood as not limited to any particular segment configurations.

In one exemplary embodiment, the optimum phase setting for each mask within each segment is shown as $\Delta c_{opt}(i)$. This corresponds to the control code (for example, the CMU) that produced the largest signal at the RU under the ith segment mask, $M(i)$. For a CRL greater than one (1), starting with mask n and going through CRL more masks, there would be the same number of the $\Delta c_{opt}(i)$ values. At the end of one communication run length, when these individual values are communicated back to the GU by the RU, a new control code setting associated with the new phase can be calculated using the following:

$$\Delta C = \mathrm{mod}\left(\sum_{i=n}^{n+CRL} \Delta c_{opt}(i) M(i), P\right)$$

where matrix P captures the local period of the phase shift in units of the phase shifter code for individual phase shifters (e.g., CMUs associated with each array element) and the mod operation is for a full 360° or 2π phase shift.

In several embodiments, the overall wireless power transfer process involves one or multiple iterations of a process of performing phase sweeps using a set of masks with respect to each segment in a GPU array. The loop can start from a random initial state or use previously evaluated phase settings as a starting point to provide faster convergence to an optimal phase setting. In each iteration, the phase sweep range (PSR), the number of phase steps (NPS), the segmentation sizes ($M_s \times N_s$), and the communication run length (CRL) can change. In many embodiments, smaller segment sizes can be used in the early iterations in combination with a relatively larger PSR. This is where due to large changes in the phase of elements with respect to each other a large change in the received power in the wireless power received at a RU can be observed and the larger dynamic range allows for a smaller number of elements to be changed in each step (smaller segment sizes). In a number of embodiments, as the main loop progresses, and the coarse phase tuning transitions toward finer tuning (smaller PSR), the variation in the amplitude becomes smaller and larger segmentations (potentially up to full array size) can be utilized as the larger number of elements can generate larger power in the calibration signal despite the smaller PSR.

An example of pseudocode that can be used to implement a wireless power transfer process in accordance with an embodiment of the invention is provided in FIG. 12. A slightly modified version of this algorithm can be applied independently (or not) for the amplitude settings. In this case, the mod operation at the end can be omitted, and, instead, the amplitude settings could be renormalized to the maximum resulting value). In addition, any reference to phase (e.g., phase sweep range) could be generalized to amplitude (e.g. amplitude sweep range).

Figure 13A:
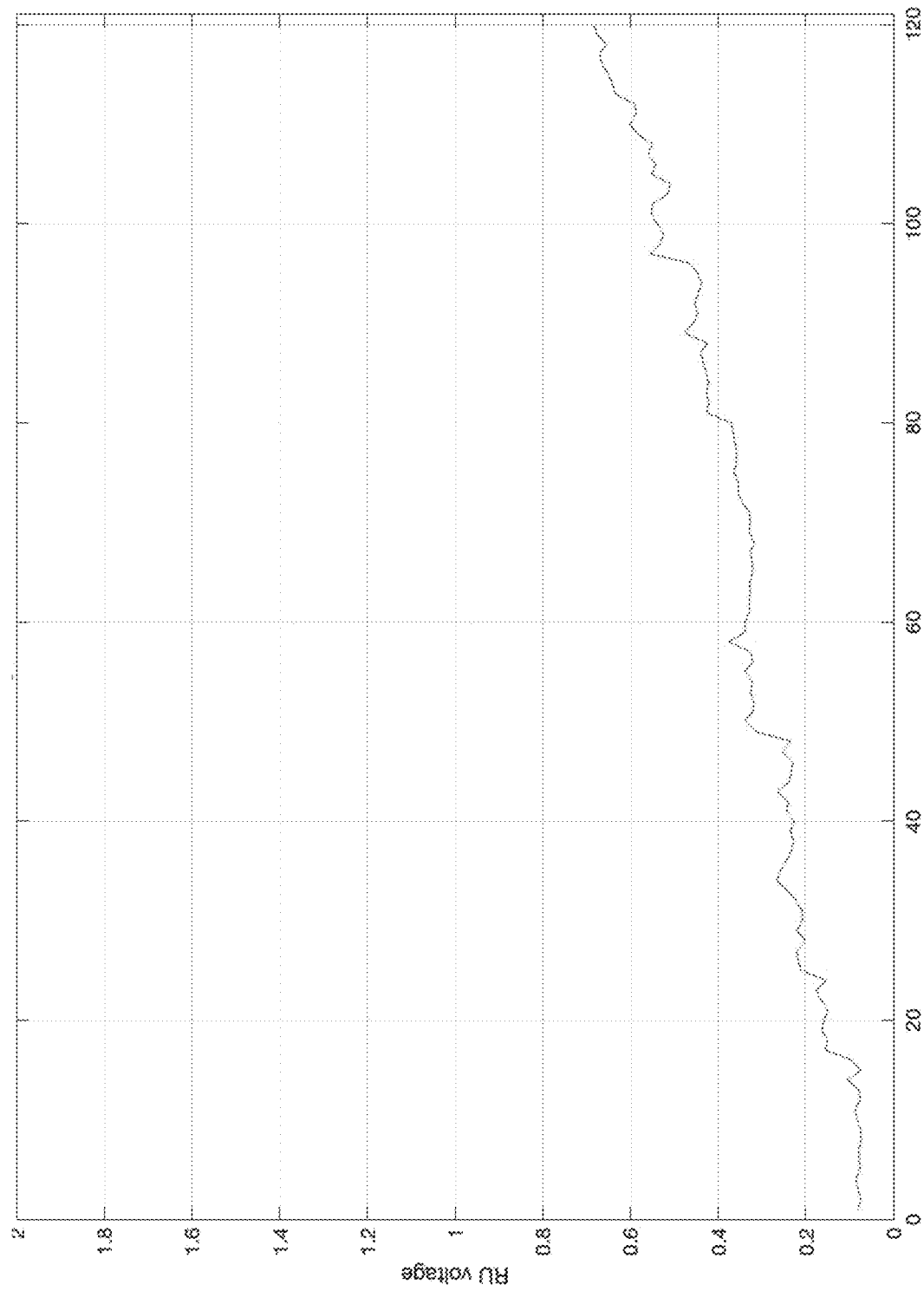
FIGS. 13A-13C are charts containing measurements comparing conventional wireless power transfer processes and a wireless transfer process implemented in a manner similar to the pseudocode shown in FIG. 12.
Figure 13B:
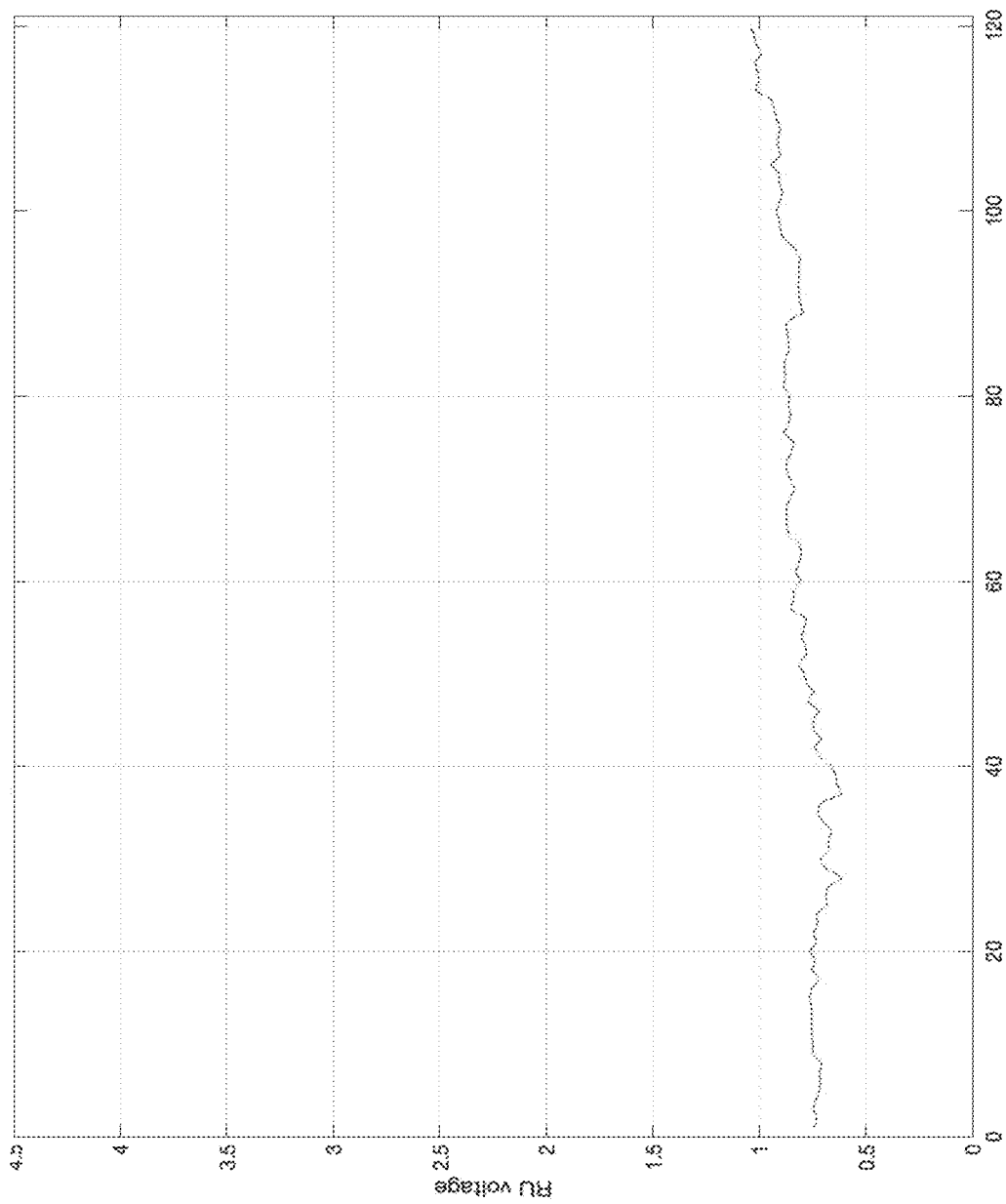
Figure 13C:
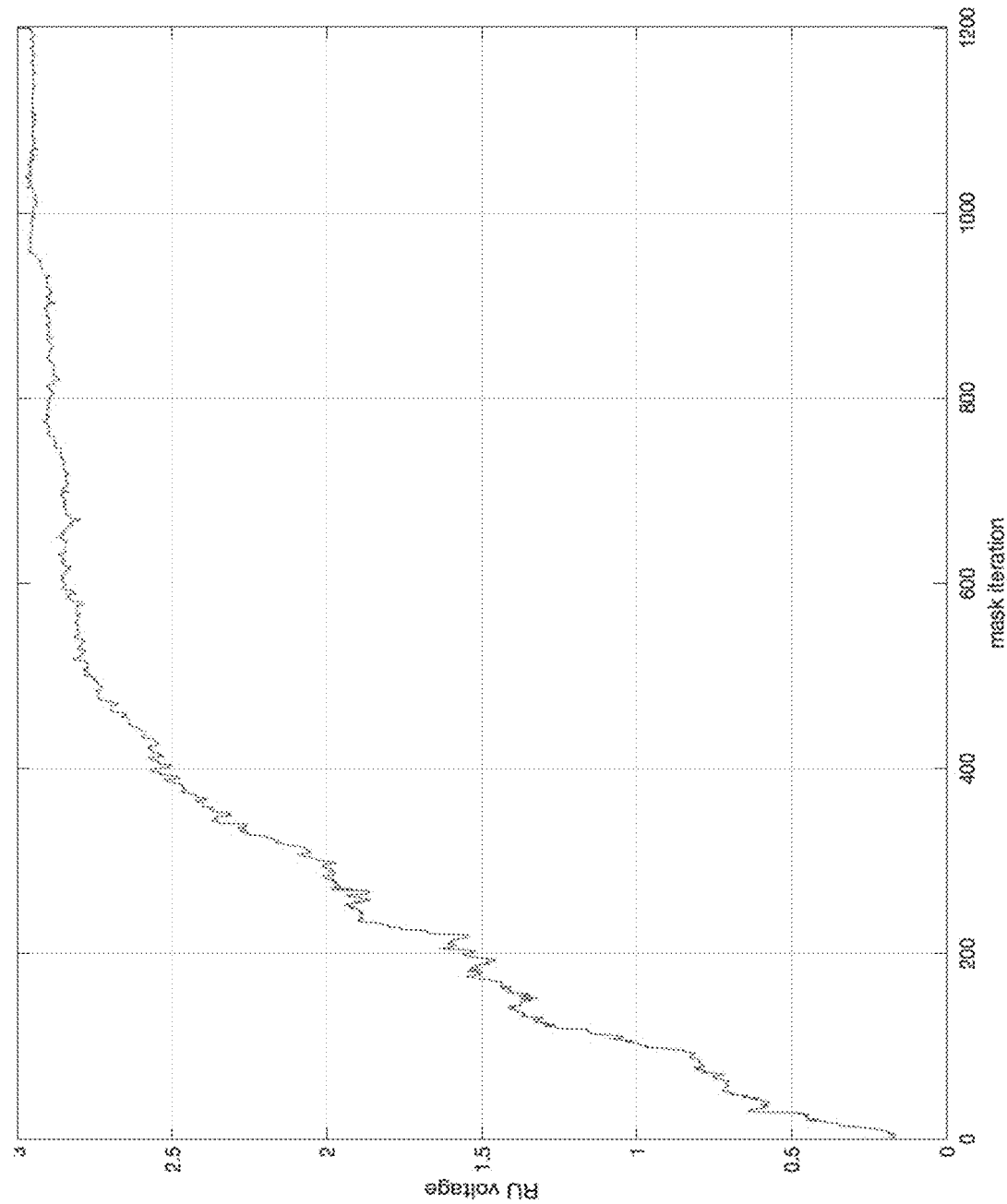

A wireless power transfer process implemented in a manner similar to the pseudocode shown in FIG. 12 can be shown to be substantially superior to modifying the phase of individual elements in the GU array, as demonstrated by the measurements shown in FIG. 13A-FIG. 13C. FIG. 13A shows voltage generated at an RU when the phase of individual elements are separately modified on a 10×12 GU array with 36 phase steps per individual element and one communication per full sweeps of 8 elements. FIG. 13B shows voltage generated at an RU when the phases of individual elements of the 10×12 GU are separately modified starting at an initial state with the phase settings that were the final phase settings at the end of the first round of phase modifications shown in FIG. 13A. By contrast, FIG. 13C shows a wireless power transfer process implemented in a manner similar to the pseudocode shown in FIG. 12 for a 10×12 GU array as the phase of its elements are modified with increasing segmentation (minimum of 1×1 and maximum of 10×12), NPS=2, and progressively scaling PSR at the narrow down factor (NDF) of 1.8517. It should be noted that the power received at the RU is the voltage squared. Therefore, the process performed during the capture of the data shown in FIG. 13C results in the wireless transfer of 8.4 times more power than that received using the process shown in FIGS. 13A and 13B.

While specific wireless power transfer processes and sequences of iterations are described above, any of a variety of wireless power transfer processes that apply phase sweeps to groups of elements in a coordinated manner to achieve variations in a received power signal that are above the noise floor of the system can be utilized as appropriate to the requirements of specific applications in accordance with various embodiments of the invention. Furthermore, while the optimization processes described herein are discussed in the context of wireless power transfer, similar processes can also be utilized in other applications, such as sensing and communications, where efficient focusing of an RF signal can be beneficial.

Although the present invention has been described in certain specific aspects, many additional modifications and variations would be apparent to those skilled in the art. It is therefore to be understood that the present invention may be practiced otherwise than specifically described, including various changes in the implementation other than those described herein such as (but not limited to) focusing processes that perform refocusing using guided searches that can include gradient descent processes, without departing from the scope and spirit of the present invention. Thus, embodiments of the present invention should be considered in all respects as illustrative and not restrictive.

What is claimed is:
1. A wireless power transfer system, comprising:
a wireless power generating unit (GU) comprising:
  a plurality of RF power sources, where the RF power sources are synchronized and each RF power source comprises at least one antenna element;
  control circuitry configured to adjust at least the phases of the RF power sources;
  a processing system configured to generate control signals to control at least the phase of the RF power sources via the control circuitry; and a receiver configured to receive messages from at least one recovery unit (RU);
wherein the processing system is configured to focus the RF power sources by:
sending control signals to the control circuitry to perform a plurality of sweeps using each of a plurality of different basis masks, where each sweep comprises:
performing a phase sweep across a phase sweep range at a plurality of phase step increments with respect to a first group of RF power sources identified in a basis mask,
where the first group of RF power sources comprises a plurality of RF power sources;
receiving via the receiver at least one message from a RU, where each of the at least one message contains a report based upon received power measurements made by the RU during at least one of the plurality of sweeps; and
sending control signals to the control circuitry of the plurality of RF power sources to focus the RF power sources based at least in part upon the received at least one message from the RU.

2. The wireless power transfer system of claim 1, wherein:
the control circuitry of at least one of the RF power sources is also configured to adjust the amplitude of the RF power source; and
the sweep further comprises performing an amplitude sweep across an amplitude sweep range at a plurality of amplitude step increments with respect to the first group of RF power sources identified in the basis mask.

3. The wireless power transfer system of claim 1, wherein:
the control circuitry of the plurality of RF power sources is also configured to adjust the polarization of the RF power sources; and
the sweep further comprises performing the phase sweep with respect to each polarization of the RF power sources.

4. The wireless power transfer system of claim 1, where each phase sweep further comprises maintaining a phase offset of a second group of RF power sources identified in the basis mask during the phase sweep, where the second group of RF power sources does not include any of the RF power sources from the first group.

5. The wireless power transfer system of claim 1, where each phase sweep further comprises simultaneously performing an opposite phase sweep across the phase sweep range at a plurality of negative phase step increments with respect to a second group of RF power sources identified in the basis mask, where the second group of RF power sources does not include any of the RF power sources from the first group.

6. The wireless power transfer system of claim 1, wherein the processing system is further configured to commence at least one phase sweep by sending control signals to the control circuitry to generate a synchronization pulse using the RF power sources.

7. The wireless power transfer system of claim 1, wherein the size of the basis masks from the plurality of different basis masks changes between at least some of the plurality of phase sweeps.

8. The wireless power transfer system of claim 6, wherein the phase sweep range changes between at least some of the plurality of phase sweeps.

9. The wireless power transfer system of claim 8, wherein over the course of the plurality of phase sweeps:
the size of the basis masks increases; and
the size of the phase sweep range decreases.

10. The wireless power transfer system of claim 6, wherein the phase step increment changes between at least some of the plurality of phase sweeps.

11. The wireless power transfer system of claim 1, wherein the phase sweep range changes between at least some of the plurality of phase sweeps.

12. The wireless power transfer system of claim 1, wherein the phase step increment changes between at least some of the plurality of phase sweeps.

13. The wireless power transfer system of claim 1, wherein the plurality of different basis masks comprises a set of basis masks that are orthogonal.

14. The wireless power transfer system of claim 1, wherein the plurality of different basis masks comprises a set of basis masks that are nearly orthogonal.

15. The wireless power transfer system of claim 1, wherein the at least one message comprises a plurality of message and that contain reports based upon received power measurements made by the RU during different numbers of sweeps.

16. The wireless power transfer system of claim 1, wherein the processing system is further configured to:
receive via the receiver a message from the RU indicating a decrease in received power at the RU;
determine a location based upon the focus of the RF power sources;
perform a guided search by:
sending control signals to the control circuitry to adjust the phases of the RF power sources to perform a focusing sequence comprising focusing the RF power sources on a sequence of locations proximate the determined location;
receiving via the receiver at least one new message from the RU, where each of the at least one message contains a report based upon received power measurements made by the RU during at least a portion of the focusing sequence; and
sending control signals to the control circuitry of the plurality of RF power sources to update the focus the RF power sources based at least in part upon the received at least one new message from the RU.

17. The wireless power transfer system of claim 16, wherein:
the message from the RU indicating a decrease in received power at the RU also includes tracking data based upon at least one measurement made using an inertial measurement unit; and
the sequence of locations proximate the determined location on which the RF power sources are focused during the guided search are selected at least in part based upon the tracking data.

18. The wireless power transfer system of claim 1, wherein:
the RU comprises a coherent receiver and is configured to measure amplitude and phase information;
the processing system is configured to:
receive via the receiver at least one message containing amplitude and phase information measured by the RU; and
update at least the phases of the RF power sources based at least in prat on the received at least one message containing amplitude and phase information measured by the RU.

19. A wireless power transfer system, comprising:
a wireless power generating unit (GU) comprising:

a plurality of RF power sources, where the RF power sources are synchronized and each RF power source comprises at least one antenna element;

control circuitry configured to adjust at least the phases of the RF power sources;

a processing system configured to generate control signals to control at least the phase of the RF power sources via the control circuitry; and a receiver configured to receive messages from at least one recovery unit (RU);

wherein the processing system is configured to focus the RF power sources by:

sending control signals to the control circuitry to perform a plurality of sweeps using each of a plurality of different basis masks, where each sweep comprises:

performing a phase sweep across a phase sweep range at a plurality of phase step increments with respect to a first group of RF power sources identified in a basis mask, where the first group of RF power sources comprises a plurality of RF power sources;

receiving via the receiver at least one message from a RU, where each of the at least one message contains a report based upon received power measurements made by the RU during at least one of the plurality of sweeps; and sending control signals to the control circuitry of the plurality of RF power sources to focus the RF power sources based at least in part upon the received at least one message from the RU;

wherein the size of the basis masks from the plurality of different basis masks changes between at least some of the plurality of phase sweeps;

wherein the phase sweep range changes between at least some of the plurality of phase sweeps; and wherein the phase step increment changes between at least some of the plurality of phase sweeps.

20. A method of performing wireless power transfer comprising:

sending control signals to control circuitry of a wireless power generating unit (GU) that comprises a plurality of RF power sources to perform a plurality of sweeps of the RF power sources using each of a plurality of different basis masks, where each sweep comprises:

performing a phase sweep across a phase sweep range at a plurality of phase step increments with respect to a first group of RF power sources identified in a basis mask, where the first group of RF power sources comprises a plurality of RF power sources;

receiving via a receiver in the GU at least one message from a recovery unit (RU), where each of the at least one message contains a report based upon received power measurements made by the RU during at least one of the plurality of sweeps; and sending control signals to the control circuitry of the GU to focus the RF power sources based at least in part upon the received at least one message from the RU.

* * * * *